US012647558B2

(12) United States Patent
Paluri et al.

(10) Patent No.: US 12,647,558 B2
(45) Date of Patent: *Jun. 2, 2026

(54) ADAPTIVE LOOP FILTERING-BASED IMAGE CODING APPARATUS AND METHOD

(71) Applicant: LG ELECTRONICS INC., Seoul (KR)

(72) Inventors: Seethal Paluri, Seoul (KR); Hendry Hendry, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/828,702

(22) Filed: Sep. 9, 2024

(65) Prior Publication Data

US 2024/0430418 A1      Dec. 26, 2024

Related U.S. Application Data

(63) Continuation of application No. 17/792,600, filed as application No. PCT/KR2021/000607 on Jan. 15, 2021, now Pat. No. 12,113,973.

(60) Provisional application No. 62/961,697, filed on Jan. 15, 2020.

(51) Int. Cl.
| | |
|---|---|
| *H04N 19/117* | (2014.01) |
| *G06V 10/60* | (2022.01) |
| *H04N 19/132* | (2014.01) |
| *H04N 19/172* | (2014.01) |
| *H04N 19/186* | (2014.01) |
| *H04N 19/70* | (2014.01) |
| *H04N 19/82* | (2014.01) |

(52) U.S. Cl.
CPC ........... *H04N 19/117* (2014.11); *G06V 10/60* (2022.01); *H04N 19/132* (2014.11); *H04N 19/172* (2014.11); *H04N 19/186* (2014.11); *H04N 19/70* (2014.11); *H04N 19/82* (2014.11)

(58) Field of Classification Search
CPC .. H04N 19/117; H04N 19/132; H04N 19/172; H04N 19/186; H04N 19/70; H04N 19/82; G06V 10/60
See application file for complete search history.

(56) References Cited

U.S. PATENT DOCUMENTS

| | | | | |
|---|---|---|---|---|
| 2018/0295363 A1* | 10/2018 | Nam | ........................ | H04N 19/44 |
| 2022/0182620 A1* | 6/2022 | Paluri | .................... | H04N 19/70 |
| 2022/0256201 A1* | 8/2022 | Chen | .................... | H04N 19/117 |

* cited by examiner

*Primary Examiner* — Jonathan R Messmore

(74) *Attorney, Agent, or Firm* — Bryan Cave Leighton Paisner LLP

(57) ABSTRACT

According to embodiment(s) of the present document, computational overhead and complexity can be reduced by using a 0th-order exponential Golomb coding scheme (ue(v)) for procedures of parsing syntax elements/information about absolute values of luma/chroma ALF filter coefficients. In addition, coding using ue(v) can be efficiently performed by fixing the range of values of the information about the absolute values of the luma/chroma ALF filter coefficients.

15 Claims, 10 Drawing Sheets

ADAPTIVE LOOP FILTERING-BASED IMAGE CODING APPARATUS AND METHOD

CROSS-REFERENCE TO RELATED APPLICATIONS

This application is a Continuation of U.S. patent application Ser. No. 17/792,600, filed on Jul. 13, 2022, which is a National Stage of International Application No. PCT/KR2021/000607, filed on Jan. 15, 2021, which claims the benefit of U.S. Provisional Application No. 62/961,697, filed on Jan. 15, 2020, the contents of which are all hereby incorporated by reference herein in their entirety.

BACKGROUND OF THE DISCLOSURE

Field of the Disclosure

The present disclosure relates to a method and apparatus for adaptive in-loop filtering based image coding.

Related Art

Recently, demand for high-resolution, high-quality image/video such as 4K or 8K or higher ultra high definition (UHD) image/video has increased in various fields. As image/video data has high resolution and high quality, the amount of information or bits to be transmitted increases relative to the existing image/video data, and thus, transmitting image data using a medium such as an existing wired/wireless broadband line or an existing storage medium or storing image/video data using existing storage medium increase transmission cost and storage cost.

In addition, interest and demand for immersive media such as virtual reality (VR) and artificial reality (AR) content or holograms has recently increased and broadcasting for image/video is having characteristics different from reality images such as game images has increased.

Accordingly, a highly efficient image/video compression technology is required to effectively compress, transmit, store, and reproduce information of a high-resolution, high-quality image/video having various characteristics as described above.

Additionally, discussions are being made on techniques, such as adaptive loop filtering (ALF), and so on, in order to in order to enhance compression efficiency and to improve subjective/objective visual quality. In order to efficiently apply such techniques, a method for efficiently signaling related information is needed.

SUMMARY OF THE DISCLOSURE

Technical Solutions

According to an embodiment of the present document, provided herein is a method and apparatus for increasing image/video coding efficiency.

According to an embodiment of the present document, provided herein is a method and apparatus for applying efficient filtering.

According to an embodiment of the present document, provided herein is a method and apparatus for efficiently applying adaptive loop filtering (ALF).

According to an embodiment of the present document, provided herein is a method and apparatus for increasing image/video coding efficiency.

According to an embodiment of the present document, provided herein is a method and apparatus for hierarchically signaling ALF related information.

According to an embodiment of the present document, a 0-th order exponential Golomb scheme (ue(v)) may be used for a parsing procedure of information/syntax element related to absolute values of luma/chroma ALF filter coefficients.

According to an embodiment of the present document, a range of values of information related to the absolute values of luma/chroma ALF filter coefficients may be fixed.

According to an embodiment of the present document, an encoding apparatus for performing video/image encoding is provided.

According to one embodiment of the present document, there is provided a computer-readable digital storage medium in which encoded video/image information, generated according to the video/image encoding method disclosed in at least one of the embodiments of the present document, is stored.

According to an embodiment of the present document, there is provided a computer-readable digital storage medium in which encoded information or encoded video/image information, causing to perform the video/image decoding method disclosed in at least one of the embodiments of the present document by the decoding apparatus, is stored.

Effects of the Disclosure

According to an embodiment of the present document, overall compression efficiency of an image/video may be enhanced.

According to an embodiment of the present document, subjective/objective visual quality may be enhanced through efficient filtering.

According to an embodiment of the present document, ALF related information may be efficiently signaled.

According to an embodiment of the present document, by using a 0-th order exponential Golomb scheme (ue(v)) for a parsing procedure of information/syntax element related to absolute values of luma/chroma ALF filter coefficients, operational (or computational) overhead and complexity may be reduced.

According to an embodiment of the present document, by fixing a range of values of information related to the absolute values of luma/chroma ALF filter coefficients, coding using ue(v) may be performed.

BRIEF DESCRIPTION OF THE DRAWINGS

FIG. 2 is a view schematically illustrating the configuration of a video/image encoding apparatus to which embodiments of the present disclosure may be applied.

DESCRIPTION OF EXEMPLARY EMBODIMENTS

Figure 1:
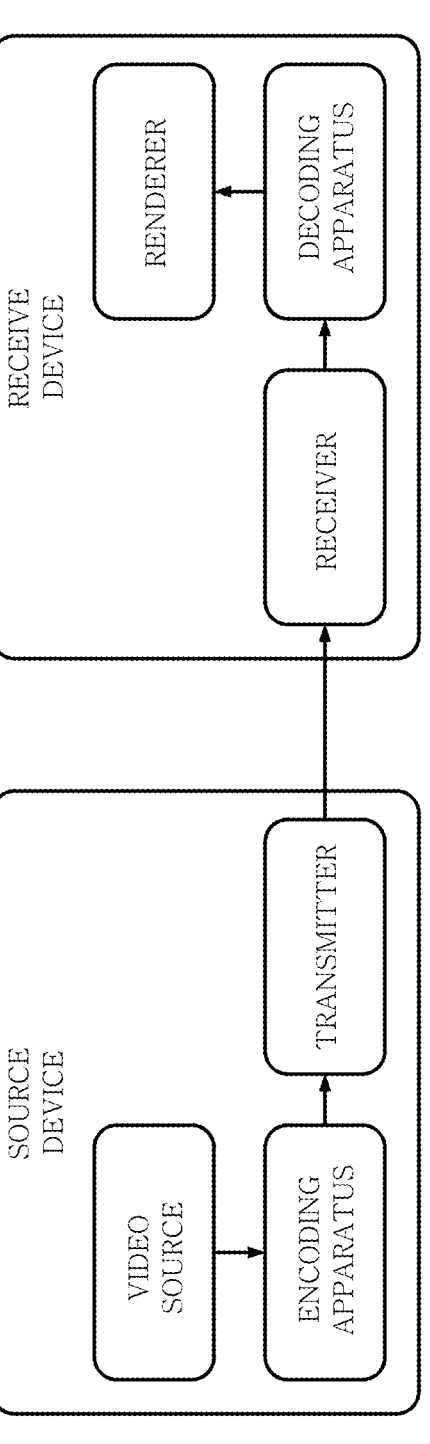
FIG. 1 schematically shows an example of a video/image coding system to which embodiments of the present disclosure may be applied.

This document relates to video/image coding. For example, methods/embodiments disclosed in this document may be related to the versatile video coding (VVC) standard (ITU-T Rec. H.266), the next-generation video/image coding standard after VVC, or other video coding related standards (e.g., high efficiency video coding (HEVC) standard (ITU-T Rec. H.265), essential video coding (EVC) standard, AVS2 standard, and the like).

This document suggests various embodiments of video/image coding, and the above embodiments may also be performed in combination with each other unless otherwise specified.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

In addition, each configuration of the drawings described in this document is an independent illustration for explaining functions as features that are different from each other, and does not mean that each configuration is implemented by mutually different hardware or different software. For example, two or more of the configurations can be combined to form one configuration, and one configuration can also be divided into multiple configurations. Without departing from the gist of this document, embodiments in which configurations are combined and/or separated are included in the scope of claims.

Hereinafter, examples of the present embodiment will be described in detail with reference to the accompanying drawings. In addition, like reference numerals are used to indicate like elements throughout the drawings, and the same descriptions on the like elements will be omitted.

In this document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows. Alternatively, the sample may mean a pixel value in the spatial domain, and when such a pixel value is transformed to the frequency domain, it may mean a transform coefficient in the frequency domain.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

In the present specification, "at least one of A and B" may mean "only A", "only B", or "both A and B". Further, in the present specification, the expression "at least one of A or B" or "at least one of A and/or B" may be interpreted the same as "at least one of A and B".

Further, in the present specification, "at least one of A, B and C" may mean "only A", "only B", "only C", or "any combination of A, B and C". Further, "at least one of A, B or C" or "at least one of A, B and/or C" may mean "at least one of A, B and C".

Further, the parentheses used in the present specification may mean "for example". Specifically, in the case that "prediction (intra prediction)" is expressed, it may be indicated that "intra prediction" is proposed as an example of "prediction". In other words, the term "prediction" in the present specification is not limited to "intra prediction", and it may be indicated that "intra prediction" is proposed as an example of "prediction". Further, even in the case that "prediction (i.e., intra prediction)" is expressed, it may be indicated that "intra prediction" is proposed as an example of "prediction".

In the present specification, technical features individually explained in one drawing may be individually implemented, or may be simultaneously implemented.

FIG. 1 illustrates an example of a video/image coding system to which the disclosure of the present document may be applied.

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
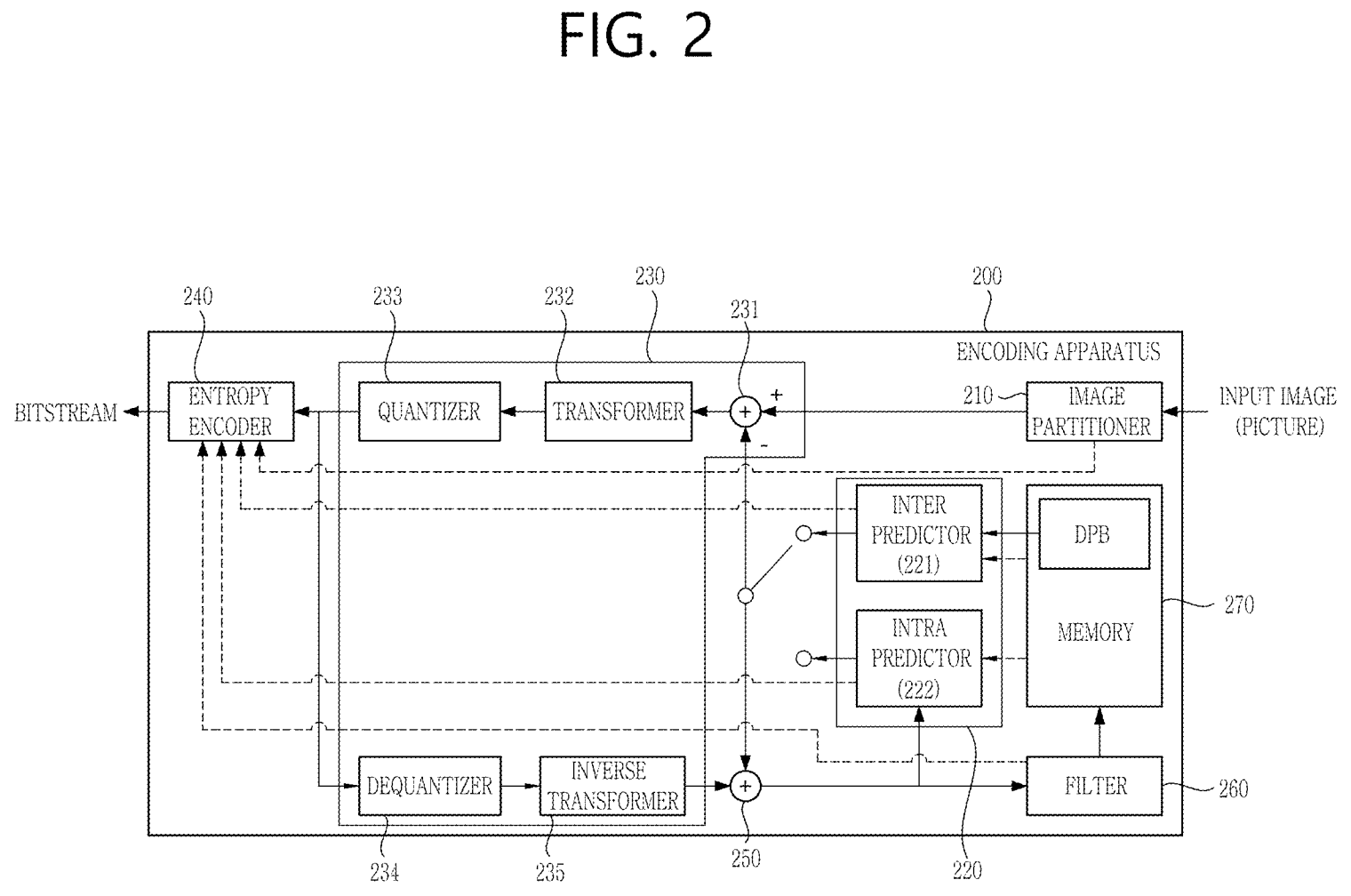

FIG. 2 is a diagram schematically illustrating the configuration of a video/image encoding apparatus to which the disclosure of the present document may be applied. Hereinafter, what is referred to as the video encoding apparatus may include an image encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present disclosure may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The subtractor 231 may generate a residual signal (residual block, residual samples, or residual sample array) by subtracting a prediction signal (predicted block, prediction samples, or prediction sample array) output from the predictor 220 from an input image signal (original block, original samples, or original sample array), and the generated residual signal is transmitted to the transformer 232. The predictor 220 may perform prediction for a processing target block (hereinafter, referred to as a "current block"), and generate a predicted block including prediction samples for the current block. The predictor 220 may determine whether intra prediction or inter prediction is applied on a current block or in a CU unit. As described later in the description of each prediction mode, the predictor may generate various kinds of information related to prediction, such as prediction mode information, and transfer the generated information to the entropy encoder 240. The information on the prediction may be encoded in the entropy encoder 240 and output in the form of a bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may perform an intra block copy (IBC) for prediction of a block. The intra block copy may be used for content image/moving image coding of a game or the like, for example, screen content coding (SCC). The IBC basically performs prediction in the current picture, but may be performed similarly to inter prediction in that a reference block is derived in the current picture. That is, the IBC may use at least one of inter prediction techniques described in the present document.

The prediction signal generated through the inter predictor 221 and/or the intra predictor 222 may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a graph-based transform (GBT), or a conditionally non-linear transform (CNT). Here, the GBT means transform obtained from a graph when relationship information between pixels is represented by the graph. The CNT refers to the transform obtained based on a prediction signal generated using all previously reconstructed pixels. In addition, the transform process may be applied to square pixel blocks having the same size, or may be applied to blocks having a variable size rather than a square.

The quantizer 233 may quantize the transform coefficients and transmit them to the entropy encoder 240, and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order, and generate information on the quantized transform coefficients based on the quantized transform coefficients in the one-dimensional vector form. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction together with or separately from the quantized transform coefficients (e.g., values of syntax elements and the like). Encoded information (e.g., encoded video/image information) may be transmitted or stored in the unit of a network abstraction layer (NAL) in the form of a bitstream. The video/image information may further include information on various parameter sets, such as an adaptation parameter set (APS), a picture parameter set (PPS), a sequence parameter set (SPS), or a video parameter set (VPS). In addition, the video/image information may further include general constraint information. In the present document, information and/or syntax elements being signaled/transmitted to be described later may be encoded through the above-described encoding procedure, and be included in the bitstream. The bitstream may be transmitted through a network, or may be stored in a digital storage medium. Here, the network may include a broadcasting network and/or a communication network, and the digital storage medium may include various storage media, such as USB, SD, CD, DVD, Blu-ray, HDD, SSD, and the like. A transmitter (not illustrated) transmitting a signal output from the entropy encoder 240 and/or a storage unit (not illustrated) storing the signal may be configured as an internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the predictor 220 to generate a reconstructed signal (reconstructed picture, reconstructed block, reconstructed samples, or reconstructed sample array). If there is no residual for the processing target block, such as a case that a skip mode is applied, the predicted block may be used as the reconstructed block. The generated reconstructed signal may be used for intra prediction of a next processing target block in the current picture, and may be used for inter prediction of a next picture through filtering as described below.

Meanwhile, luma mapping with chroma scaling (LMCS) may be applied during a picture encoding and/or reconstruction process.

The filter 260 may improve subjective/objective image quality by applying filtering to the reconstructed signal. For example, the filter 260 may generate a modified reconstructed picture by applying various filtering methods to the reconstructed picture, and store the modified reconstructed picture in the memory 270, specifically, in a DPB of the memory 270. The various filtering methods may include, for example, deblocking filtering, a sample adaptive offset (SAO), an adaptive loop filter, a bilateral filter, and the like. The filter 260 may generate various kinds of information related to the filtering, and transfer the generated information to the entropy encoder 290 as described later in the description of each filtering method. The information related to the filtering may be encoded by the entropy encoder 290 and output in the form of a bitstream.

The modified reconstructed picture transmitted to the memory 270 may be used as a reference picture in the inter predictor 221. When the inter prediction is applied through the encoding apparatus, prediction mismatch between the encoding apparatus 200 and the decoding apparatus can be avoided and encoding efficiency can be improved.

The DPB of the memory 270 may store the modified reconstructed picture for use as the reference picture in the inter predictor 221. The memory 270 may store motion information of a block from which the motion information in the current picture is derived (or encoded) and/or motion information of blocks in the picture, having already been reconstructed. The stored motion information may be transferred to the inter predictor 221 to be utilized as motion information of the spatial neighboring block or motion information of the temporal neighboring block. The memory 270 may store reconstructed samples of reconstructed blocks in the current picture, and may transfer the reconstructed samples to the intra predictor 222.

Figure 3:
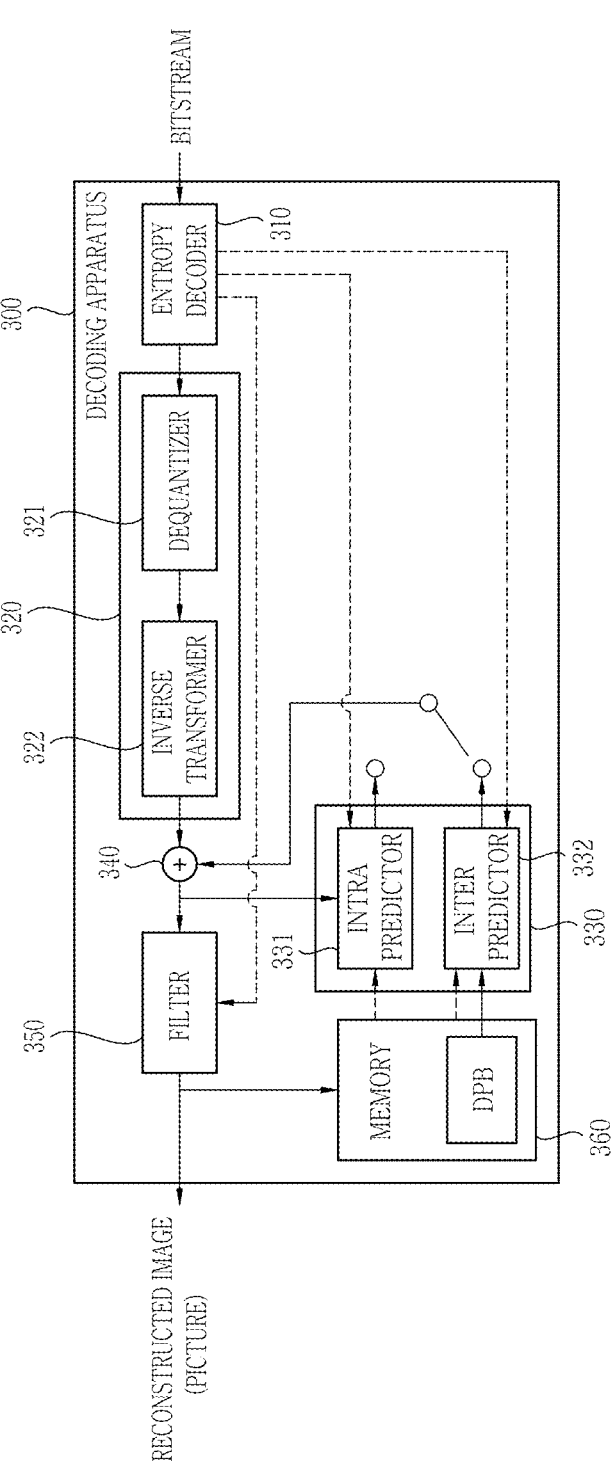
FIG. 3 is a view schematically illustrating the configuration of a video/image decoding apparatus to which embodiments of the present disclosure may be applied.

FIG. 3 is a diagram for schematically explaining the configuration of a video/image decoding apparatus to which the disclosure of the present document may be applied.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model by using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor 330, and information on the residual on which the entropy decoding has been performed in the entropy decoder 310, that is, the quantized transform coefficients and related parameter information, may be input to the dequantizer 321. In addition, information on filtering among information decoded by the entropy decoder 310 may be provided to the filter 350. Meanwhile, a receiver (not illustrated) for receiving a signal output from the encoding apparatus may be further configured as an internal/external element of the decoding apparatus 300, or the receiver may be a constituent element of the entropy decoder 310. Meanwhile, the decoding apparatus according to the present document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the predictor 330, the adder 340, the filter 350, and the memory 360.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may perform an intra block copy (IBC) for prediction of a block. The intra block copy may be used for content image/moving image coding of a game or the like, for example, screen content coding (SCC). The IBC basically performs prediction in the current picture, but may be performed similarly to inter prediction in that a reference block is derived in the current picture. That is, the IBC may use at least one of inter prediction techniques described in the present document.

The intra predictor 332 may predict the current block by referring to the samples in the current picture. The referred samples may be located in the neighborhood of the current block, or may be located apart from the current block according to the prediction mode. In intra prediction, prediction modes may include a plurality of non-directional modes and a plurality of directional modes. The intra predictor 332 may determine the prediction mode to be applied to the current block by using the prediction mode applied to the neighboring block.

The inter predictor 331 may derive a predicted block for the current block based on a reference block (reference sample array) specified by a motion vector on a reference picture. In this case, in order to reduce the amount of motion information being transmitted in the inter prediction mode, motion information may be predicted in the unit of blocks, subblocks, or samples based on correlation of motion information between the neighboring block and the current block. The motion information may include a motion vector and a reference picture index. The motion information may further include information on inter prediction direction (L0 prediction, L1 prediction, Bi prediction, and the like). In case of inter prediction, the neighboring block may include a spatial neighboring block existing in the current picture and a temporal neighboring block existing in the reference picture. For example, the inter predictor 331 may construct a motion information candidate list based on neighboring blocks, and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, or reconstructed sample array) by adding the obtained residual signal to the prediction signal (predicted block or predicted sample array) output from the predictor 330. If there is no residual for the processing target block, such as a case that a skip mode is applied, the predicted block may be used as the reconstructed block.

The adder 340 may be called a reconstructor or a reconstructed block generator. The generated reconstructed signal may be used for the intra prediction of a next block to be processed in the current picture, and as described later, may also be output through filtering or may also be used for the inter prediction of a next picture.

Meanwhile, a luma mapping with chroma scaling (LMCS) may also be applied in the picture decoding process.

The filter 350 may improve subjective/objective image quality by applying filtering to the reconstructed signal. For example, the filter 350 may generate a modified reconstructed picture by applying various filtering methods to the reconstructed picture, and store the modified reconstructed picture in the memory 360, specifically, in a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 331. The memory 360 may store the motion information of the block from which the motion information in the current picture is derived (or decoded) and/or the motion information of the blocks in the picture having already been reconstructed. The stored motion information may be transferred to the inter predictor 331 so as to be utilized as the motion information of the spatial neighboring block or the motion information of the temporal neighboring block. The memory 360 may store reconstructed samples of reconstructed blocks in the current picture, and transfer the reconstructed samples to the intra predictor 332.

In the present specification, the embodiments described in the predictor 330, the dequantizer 321, the inverse transformer 322, and the filter 350 of the decoding apparatus 300 may also be applied in the same manner or corresponding to the predictor 220, the dequantizer 234, the inverse transformer 235, and the filter 260 of the encoding apparatus 200.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

In this document, at least one of quantization/dequantization and/or transform/inverse transform may be omitted. When the quantization/dequantization is omitted, the quantized transform coefficient may be referred to as a transform coefficient. When the transform/inverse transform is omitted, the transform coefficient may be called a coefficient or a residual coefficient or may still be called the transform coefficient for uniformity of expression.

In this document, the quantized transform coefficient and the transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or information on the transform coefficient(s)), and scaled transform coefficients may be derived through inverse transform (scaling) on the transform coefficients. Residual samples may be derived based on inverse transform (transform) of the scaled transform coefficients. This may be applied/expressed in other parts of this document as well.

The predictor of the encoding apparatus/decoding apparatus may derive prediction samples by performing inter prediction in units of blocks. Inter prediction can be a prediction derived in a manner that is dependent on data elements (e.g. sample values or motion information, etc) of picture(s) other than the current picture. When the inter prediction is applied to the current block, based on the reference block (reference sample arrays) specified by the motion vector on the reference picture pointed to by the reference picture index, the predicted block (prediction sample arrays) for the current block can be derived. In this case, in order to reduce the amount of motion information transmitted in the inter prediction mode, the motion information of the current block may be predicted in units of blocks, subblocks, or samples based on the correlation between the motion information between neighboring blocks and the current block. The motion information may include the motion vector and the reference picture index. The motion information may further include inter prediction type (L0 prediction, L1 prediction, Bi prediction, etc.) information. When the inter prediction is applied, the neighboring blocks may include a spatial neighboring block existing in the current picture and a temporal neighboring block existing in the reference picture. The reference picture including the reference block and the reference picture including the temporal neighboring block may be the same or different. The temporal neighboring block may be called a collocated reference block, a collocated CU (colCU), etc., and a reference picture including the temporally neighboring block may be called a collocated picture (colPic). For example, a motion information candidate list may be constructed based on neighboring blocks of the current block, and a flag or index information indicating which candidate is selected (used) to derive the motion vector and/or the reference picture index of the current block may be signaled. The inter prediction may be performed based on various prediction modes. For example, in the skip mode and the merge mode, the motion information of the current block may be the same as the motion information of a selected neighboring block. In the skip mode, unlike the merge mode, a residual signal may not be transmitted. In the case of a motion vector prediction (MVP) mode, a motion vector of a selected neighboring block may be used as a motion vector predictor, and a motion vector difference may be signaled. In this case, the motion vector of the current block may be derived using the sum of the motion vector predictor and the motion vector difference.

The motion information may include L0 motion information and/or L1 motion information according to an inter prediction type (L0 prediction, L1 prediction, Bi prediction, etc.). A motion vector in the L0 direction may be referred to as an L0 motion vector or MVL0, and a motion vector in the L1 direction may be referred to as an L1 motion vector or MVL1. The prediction based on the L0 motion vector may be called L0 prediction, the prediction based on the L1 motion vector may be called the L1 prediction, and the prediction based on both the L0 motion vector and the L1 motion vector may be called a bi-prediction. Here, the L0 motion vector may indicate a motion vector associated with the reference picture list L0 (L0), and the L1 motion vector may indicate a motion vector associated with the reference picture list L1 (L1). The reference picture list L0 may include pictures that are previous than the current picture in output order as reference pictures, and the reference picture list L1 may include pictures that are subsequent than the current picture in output order. The previous pictures may be called forward (reference) pictures, and the subsequent pictures may be called backward (reference) pictures. The reference picture list L0 may further include pictures that are subsequent than the current picture in output order as reference pictures. In this case, the previous pictures may be indexed first, and the subsequent pictures may be indexed next in the reference picture list L0. The reference picture list L1 may further include pictures previous than the current picture in output order as reference pictures. In this case, the subsequent pictures may be indexed first in the reference picture list 1 and the previous pictures may be indexed next. Here, the output order may correspond to a picture order count (POC) order.

Figure 4:
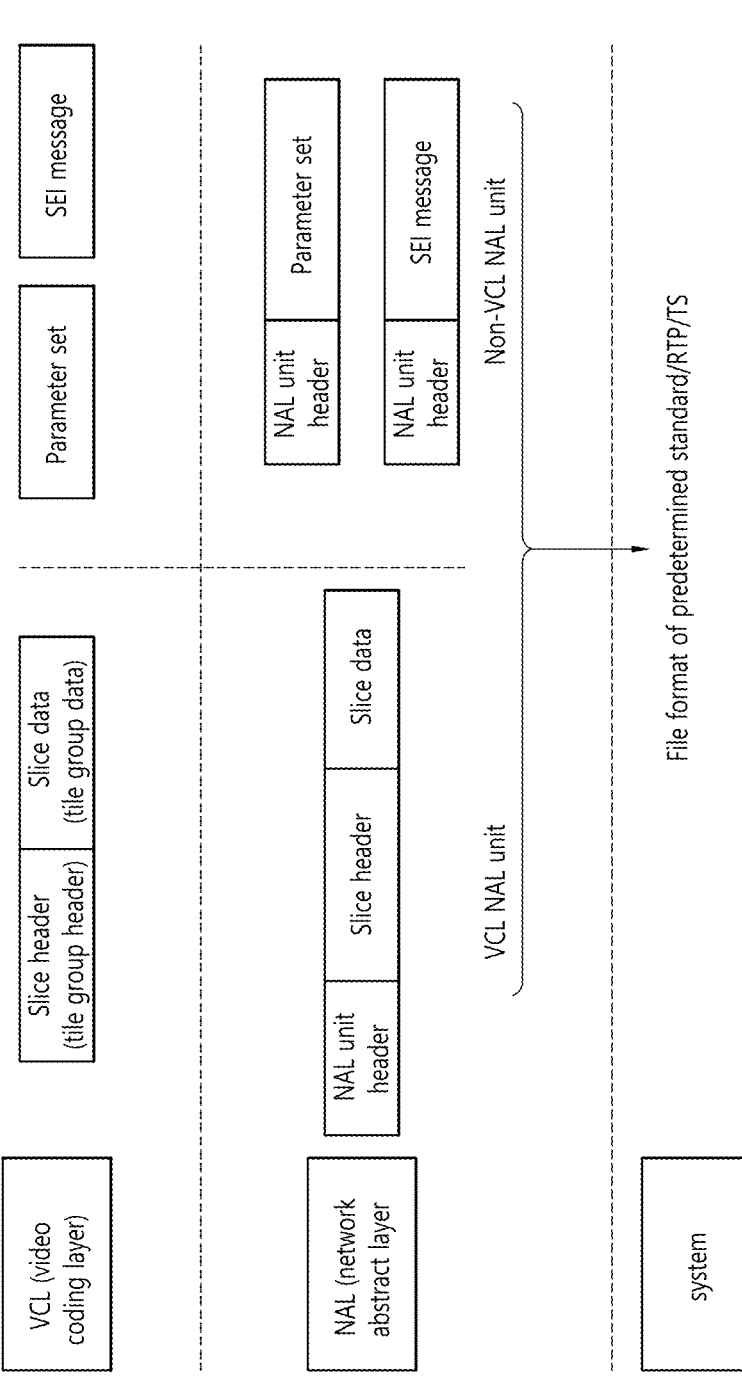
FIG. 4 exemplarily shows a hierarchical architecture for a coded video/image.

FIG. 4 exemplarily shows a hierarchical structure for a coded image/video.

Referring to FIG. 4, the coded image/video is divided into VCL (video coding layer) that deals with an image/video decoding process and itself, a subsystem that transmits and stores the coded information, and a network abstraction layer (NAL) that exists between the VCL and subsystems and is responsible for network adaptation functions.

The VCL may generate VCL data including compressed image data (slice data), or generate parameter sets including a picture parameter set (Picture Parameter Set: PPS), a sequence parameter set (Sequence Parameter Set: SPS), a video parameter set (Video Parameter Set: VPS) etc. or a supplemental enhancement information (SEI) message additionally necessary for the decoding process of an image.

In the NAL, a NAL unit may be generated by adding header information (NAL unit header) to a raw byte sequence payload (RBSP) generated in the VCL. In this case, the RBSP refers to slice data, parameter sets, SEI messages, etc. generated in the VCL. The NAL unit header may include NAL unit type information specified according to RBSP data included in the corresponding NAL unit.

As shown in the figure, the NAL unit may be divided into a VCL NAL unit and a Non-VCL NAL unit according to the RBSP generated in the VCL. The VCL NAL unit may mean a NAL unit including information (sliced data) about an image, and the Non-VCL NAL unit may mean a NAL unit containing information (parameter set or SEI message) necessary for decoding an image.

The above-described VCL NAL unit and Non-VCL NAL unit may be transmitted through a network by attaching header information according to a data standard of the subsystem. For example, the NAL unit may be transformed into a data form of a predetermined standard such as H.266/VVC file format, Real-time Transport Protocol (RTP), Transport Stream (TS), etc. and transmitted through various networks.

As described above, in the NAL unit, the NAL unit type may be specified according to the RBSP data structure included in the corresponding NAL unit, and information on this NAL unit type may be stored and signaled in the NAL unit header.

For example, the NAL unit may be roughly classified into the VCL NAL unit type and the Non-VCL NAL unit type depending on whether the NAL unit includes information about the image (slice data). The VCL NAL unit type may be classified according to property and a type of a picture included in the VCL NAL unit, and the Non-VCL NAL unit type may be classified according to the type of a parameter set.

The following is an example of the NAL unit type specified according to the type of parameter set included in the Non-VCL NAL unit type.

APS (Adaptation Parameter Set) NAL unit: Type for NAL unit including APS

DPS (Decoding Parameter Set) NAL unit: Type for NAL unit including DPS

VPS (Video Parameter Set) NAL unit: Type for NAL unit including VPS

SPS (Sequence Parameter Set) NAL unit: Type for NAL unit including SPS

PPS (Picture Parameter Set) NAL unit: Type for NAL unit including PPS

PH (Picture header) NAL unit: Type for NAL unit including PH

The above-described NAL unit types have syntax information for the NAL unit type, and the syntax information may be stored and signaled in the NAL unit header. For example, the syntax information may be nal_unit_type, and NAL unit types may be specified by a nal_unit_type value.

Meanwhile, as described above, one picture may include a plurality of slices, and one slice may include a slice header and slice data. In this case, one picture header may be further added to a plurality of slices (a slice header and a slice data set) in one picture. The picture header (picture header syntax) may include information/parameters commonly applicable to the picture. In this document, a slice may be mixed or replaced with a tile group. Also, in this document, a slice header may be mixed or replaced with a type group header.

The slice header (slice header syntax or slice header information) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may include information/parameters commonly applicable to multiple layers. The DPS (DPS syntax) may include information/parameters commonly applicable to the entire video. The DPS may include information/parameters related to concatenation of a coded video sequence (CVS). In this document, high level syntax (HLS) may include at least one of the APS syntax, PPS syntax, SPS syntax, VPS syntax, DPS syntax, picture header syntax, and slice header syntax.

In this document, the image/video information encoded in the encoding apparatus and signaled in the form of a bitstream to the decoding apparatus may include, as well as picture partitioning-related information in the picture, intra/inter prediction information, residual information, in-loop filtering information, etc. the information included in the slice header, the information included in the picture header, the information included in the APS, the information included in the PPS, the information included in the SPS, the information included in the VPS, and/or the information included in the DPS. In addition, the image/video information may further include information of the NAL unit header.

The following table shows coding descriptors for a parsing procedure of coding-related information of the present disclosure. The coding descriptors may be used for the parsing procedure of syntax elements included in the syntaxes of the present disclosure.

TABLE 1

- ac(v): context-adaptive arithmetic entropy-coded syntax element.
- b(8): byte having any pattern of bit string (8 bits). The parsing process for this descriptor is specified by the return value of the function read_bits( 8 ).
- f(n): fixed-pattern bit string using n bits written (from left to right) with the left bit first. The parsing process for this descriptor is specified by the return value of the function read_bits( n ).
- i(n): signed integer using n bits. When n is "v" in the syntax table, the number of bits varies in a manner dependent on the value of other syntax elements. The parsing process for this descriptor is specified by the return value of the function read_bits( n ) interpreted as a two's complement integer representation with most significant bit written first.
- se(v): signed integer 0-th order Exp-Golomb-coded syntax element with the left bit first. The parsing process for this descriptor is specified with the order k equal to 0.
- st(v): null-terminated string encoded as universal coded character set (UCS) transmission format-8 (UTF-8) characters as specified in ISO/IEC 10646. The parsing process is specified as follows: st(v) begins at a byte-aligned position in the bitstream and reads and returns a series of bytes from the bitstream, beginning at the current position and continuing up to but not including the next byte-aligned byte that is equal to 0x00, and advances the bitstream pointer by ( stringLength + 1 ) * 8 bit positions, where stringLength is equal to the number of bytes returned.

TABLE 1-continued

NOTE - The st(v) syntax descriptor is only used in this Specification when the current position in the
bitstream is a byte-aligned position.
- tu(v): truncated unary using up to maxVal bits with maxVal defined in the semantics of the symtax element.
- u(n): unsigned integer using n bits. When n is "v" in the syntax table, the number of bits varies in a manner
dependent on the value of other syntax elements. The parsing process for this descriptor is specified by the
return value of the function read_bits( n ) interpreted as a binary representation of an unsigned integer with
most significant bit written first.
- ue(v): unsigned integer 0-th order Exp-Golomb-coded syntax element with the left bit first. The parsing
process for this descriptor is specified with the order k equal to 0.
- uek(v): unsigned integer k-th order Exp-Golomb-coded syntax element with the left bit first. The parsing
process for this descriptor is specified with the order k defined in the semantics of the syntax element.

The following table shows x being coded based on 0-th order, first order, second order, and third order exponential Golomb coding. For example, x may be a decimal number, and a coded x may be a binary number. k represents an order for the exponential Golomb coding (wherein k=0, 1, 2, 3).

0-th order exponential Golomb coding (wherein k=0) may be used for a syntax element parsing procedure according a coding descriptor of the aforementioned ue(v), and reference may be made to Table 2 (wherein k=0) for parsing procedure of syntax elements based on the coding descriptor of ue(v).

TABLE 2

| x | coded x \| k = 0 | coded x \| k = 1 | coded x \| k = 2 | coded x \| k = 3 |
|---|---|---|---|---|
| 0 | 1 | 10 | 100 | 1000 |
| 1 | 010 | 11 | 101 | 1001 |
| 2 | 011 | 0100 | 110 | 1010 |
| 3 | 00100 | 0101 | 111 | 1011 |
| 4 | 00101 | 0110 | 01000 | 1100 |
| 5 | 00110 | 0111 | 01001 | 1101 |
| 6 | 00111 | 001000 | 01010 | 1110 |
| 7 | 0001000 | 001001 | 01011 | 1111 |
| 8 | 0001001 | 001010 | 01100 | 010000 |
| 9 | 0001010 | 001011 | 01101 | 010001 |
| 10 | 0001011 | 001100 | 01110 | 010010 |
| 11 | 0001100 | 001101 | 01111 | 010011 |
| 12 | 0001101 | 001110 | 0010000 | 010100 |
| 13 | 0001110 | 001111 | 0010001 | 010101 |
| 14 | 0001111 | 00010000 | 0010010 | 010110 |
| 15 | 000010000 | 00010001 | 0010011 | 010111 |
| 16 | 000010001 | 00010010 | 0010100 | 011000 |
| 17 | 000010010 | 00010011 | 0010101 | 011001 |
| 18 | 000010011 | 00010100 | 0010110 | 011010 |
| 19 | 000010100 | 00010101 | 0010111 | 011011 |
| 20 | 000010101 | 00010110 | 0011000 | 011100 |
| 21 | 000010110 | 00010111 | 0011001 | 011101 |
| 22 | 000010111 | 00011000 | 0011010 | 011110 |
| 23 | 000011000 | 00011001 | 0011011 | 011111 |
| 24 | 000011001 | 00011010 | 0011100 | 00100000 |
| 25 | 000011010 | 00011011 | 0011101 | 00100001 |
| 26 | 000011011 | 00011100 | 0011110 | 00100010 |
| 27 | 000011100 | 00011101 | 0011111 | 00100011 |
| 28 | 000011101 | 00011110 | 000100000 | 00100100 |
| 29 | 000011110 | 00011111 | 000100001 | 00100101 |
| 30 | 000011111 | 0000100000 | 000100010 | 00100101 |
| 31 | 00000100000 | 0000100001 | 000100011 | 00100110 |
| 32 | 00000100001 | 0000100010 | 000100100 | 00100111 |
| 33 | 00000100010 | 0000100011 | 000100101 | 00101000 |
| 34 | 00000100011 | 0000100100 | 000100110 | 00101001 |
| 35 | 00000100100 | 0000100101 | 000100111 | 00101010 |
| 36 | 00000100101 | 0000100110 | 000101000 | 00101011 |
| 37 | 00000100110 | 0000100111 | 000101001 | 00101100 |
| 38 | 00000100111 | 0000101000 | 000101010 | 00101101 |
| 39 | 00000101000 | 0000101001 | 000101011 | 00101110 |
| 40 | 00000101001 | 0000101010 | 000101100 | 00101111 |
| 41 | 00000101010 | 0000101011 | 000101101 | 00110000 |
| 42 | 00000101011 | 0000101100 | 000101110 | 00110001 |
| 43 | 00000101100 | 0000101101 | 000101111 | 00110010 |
| 44 | 00000101101 | 0000101110 | 000110000 | 00110011 |
| 45 | 00000101110 | 0000101111 | 000110001 | 00110100 |
| 46 | 00000101111 | 0000110000 | 000110010 | 00110101 |
| 47 | 00000110000 | 0000110001 | 000110011 | 00110110 |
| 48 | 00000110001 | 0000110010 | 000110100 | 00110111 |
| 49 | 00000110010 | 0000110011 | 000110101 | 00111000 |
| 50 | 00000110011 | 0000110100 | 000110110 | 00111001 |
| 51 | 00000110100 | 0000110101 | 000110111 | 00111010 |
| 52 | 00000110101 | 0000110110 | 000111000 | 00111011 |
| 53 | 00000110110 | 0000110111 | 000111001 | 00111100 |
| 54 | 00000110111 | 0000111000 | 000111010 | 00111101 |

TABLE 2-continued

| x | coded x \| k = 0 | coded x \| k = 1 | coded x \| k = 2 | coded x \| k = 3 |
|---|---|---|---|---|
| 55 | 00000111000 | 0000111001 | 000111011 | 00111110 |
| 56 | 00000111001 | 0000111010 | 000111100 | 00111111 |
| 57 | 00000111010 | 0000111011 | 000111101 | 0001000000 |
| 58 | 00000111011 | 0000111100 | 000111110 | 0001000001 |
| 59 | 00000111100 | 0000111101 | 000111111 | 0001000010 |
| 60 | 00000111101 | 0000111110 | 00001000000 | 0001000011 |
| 61 | 00000111110 | 0000111111 | 00001000001 | 0001000100 |
| 62 | 00000111111 | 000001000000 | 00001000010 | 0001000101 |
| 63 | 0000000100000 | 000001000001 | 00001000011 | 0001000110 |
| 64 | 0000001000001 | 000001000010 | 00001000100 | 0001000111 |
| 65 | 0000001000010 | 000001000011 | 00001000101 | 0001001000 |
| 66 | 0000001000011 | 000001000100 | 00001000110 | 0001001001 |
| 67 | 0000001000100 | 000001000101 | 00001000111 | 0001001010 |
| 68 | 0000001000101 | 000001000110 | 00001001000 | 0001001011 |
| 69 | 0000001000110 | 000001000111 | 00001001001 | 0001001100 |
| 70 | 0000001000111 | 000001001000 | 00001001010 | 0001001101 |
| 71 | 0000001001000 | 000001001001 | 00001001011 | 0001001110 |
| 72 | 0000001001001 | 000001001010 | 00001001100 | 0001001111 |
| 73 | 0000001001010 | 000001001011 | 00001001101 | 0001010000 |
| 74 | 0000001001011 | 000001001100 | 00001001110 | 0001010001 |
| 75 | 0000001001100 | 000001001101 | 00001001111 | 0001010010 |
| 76 | 0000001001101 | 000001001110 | 00001010000 | 0001010011 |
| 77 | 0000001001110 | 000001001111 | 00001010001 | 0001010100 |
| 78 | 0000001001111 | 000001010000 | 00001010010 | 0001010101 |
| 79 | 0000001010000 | 000001010001 | 00001010011 | 0001010110 |
| 80 | 0000001010001 | 000001010010 | 00001010100 | 0001010111 |
| 81 | 0000001010010 | 000001010011 | 00001010101 | 0001011000 |
| 82 | 0000001010011 | 000001010100 | 00001010110 | 0001011001 |
| 83 | 0000001010100 | 000001010101 | 00001010111 | 0001011010 |
| 84 | 0000001010101 | 000001010110 | 00001011000 | 0001011011 |
| 85 | 0000001010110 | 000001010111 | 00001011001 | 0001011100 |
| 86 | 0000001010111 | 000001011000 | 00001011010 | 0001011101 |
| 87 | 0000001011000 | 000001011001 | 00001011011 | 0001011110 |
| 88 | 0000001011001 | 000001011010 | 00001011100 | 0001011111 |
| 89 | 0000001011010 | 000001011011 | 00001011101 | 0001100000 |
| 90 | 0000001011011 | 000001011100 | 00001011110 | 0001100001 |
| 91 | 0000001011100 | 000001011101 | 00001011111 | 0001100010 |
| 92 | 0000001011101 | 000001011110 | 00001100000 | 0001100011 |
| 93 | 0000001011110 | 000001011111 | 00001100001 | 0001100100 |
| 94 | 0000001011111 | 000001100000 | 00001100010 | 0001100101 |
| 95 | 0000001100000 | 000001100001 | 00001100011 | 0001100110 |
| 96 | 0000001100001 | 000001100010 | 00001100100 | 0001100111 |
| 97 | 0000001100010 | 000001100011 | 00001100101 | 0001101000 |
| 98 | 0000001100011 | 000001100100 | 00001100110 | 0001101001 |
| 99 | 0000001100100 | 000001100101 | 00001100111 | 0001101010 |
| 100 | 0000001100101 | 000001100110 | 00001101000 | 0001101011 |
| 101 | 0000001100110 | 000001100111 | 00001101001 | 0001101100 |
| 102 | 0000001100111 | 000001101000 | 00001101010 | 0001101101 |
| 103 | 0000001101000 | 000001101001 | 00001101011 | 0001101110 |
| 104 | 0000001101001 | 000001101010 | 00001101100 | 0001101111 |
| 105 | 0000001101010 | 000001101011 | 00001101101 | 0001110000 |
| 106 | 0000001101011 | 000001101100 | 00001101110 | 0001110001 |
| 107 | 0000001101100 | 000001101101 | 00001101111 | 0001110010 |
| 108 | 0000001101101 | 000001101110 | 00001110000 | 0001110011 |
| 109 | 0000001101110 | 000001101111 | 00001110001 | 0001110100 |
| 110 | 0000001101111 | 000001110000 | 00001110010 | 0001110101 |
| 111 | 0000001110000 | 000001110001 | 00001110011 | 0001110110 |
| 112 | 0000001110001 | 000001110010 | 00001110100 | 0001110111 |
| 113 | 0000001110010 | 000001110011 | 00001110101 | 0001111000 |
| 114 | 0000001110011 | 000001110100 | 00001110110 | 0001111001 |
| 115 | 0000001110100 | 000001110101 | 00001110111 | 0001111010 |
| 116 | 0000001110101 | 000001110110 | 00001111000 | 0001111011 |
| 117 | 0000001110110 | 000001110111 | 00001111001 | 0001111100 |
| 118 | 0000001110111 | 000001111000 | 00001111010 | 0001111101 |
| 119 | 0000001111000 | 000001111001 | 00001111011 | 0001111110 |
| 120 | 0000001111001 | 000001111010 | 00001111100 | 0001111111 |
| 121 | 0000001111010 | 000001111011 | 00001111101 | 000010000000 |
| 122 | 0000001111011 | 000001111100 | 00001111110 | 000010000001 |
| 123 | 0000001111100 | 000001111101 | 00001111111 | 000010000010 |
| 124 | 0000001111101 | 000001111110 | 0000010000000 | 000010000011 |
| 125 | 0000001111110 | 000001111111 | 0000010000001 | 000010000100 |
| 126 | 0000001111111 | 00000010000000 | 0000010000010 | 000010000101 |
| 127 | 000000010000000 | 00000010000001 | 0000010000011 | 000010000110 |
| 128 | 000000010000001 | 00000010000010 | 0000010000100 | 000010000111 |

65

Meanwhile, in order to compensate for differences between an original image and a reconstructed image caused by errors occurring during compression coding processes, such as quantization, an in-loop filtering procedure may be performed on reconstructed samples or a reconstructed picture, as described above. As described above, in-loop filtering may be performed by the filter of the encoding apparatus and the filter of the decoding apparatus, and a deblocking filter, SAO, and/or an adaptive loop filter (ALF) may be applied herein. For example, the ALF procedure may be performed after completing a deblocking filtering procedure and/or an SAO procedure. However, even in this case, the deblocking filtering procedure and/or the SAO procedure may be skipped.

Hereinafter, picture reconstruction and filtering will be described in detail. In image/video coding, reconstructed blocks may be generated based on intra prediction/inter prediction for each block unit, and a reconstructed picture including reconstructed blocks may be generated. When a current picture/slice is an I picture/slice, the blocks included in the current picture/slice may be reconstructed based only on intra prediction. Meanwhile, when the current picture/slice is a P or B picture/slice, the blocks included in the current picture/slice may be reconstructed based on intra prediction or inter prediction. In this case, intra prediction may be applied for part of the blocks within the current picture/slice, and inter prediction may be applied for the remaining blocks.

Intra prediction may represent a prediction that generates prediction samples for the current block based on reference samples within a picture (hereinafter referred to as current picture) to which the current block belongs. When intra prediction is applied to the current block, neighboring reference samples that are to be used for the intra prediction of the current block may be derived. The neighboring reference samples of the current block may include a sample adjacent to a left-side boundary of the current block having a size of nW×nH and a total of 2×nH number of samples neighboring a bottom-left side, a sample adjacent to a top-side boundary of the current block and a total of 2×nW number of samples neighboring a top-right side, and one sample neighboring a top-left side of the current block. Alternatively, the neighboring reference samples of the current block may also include top-side neighboring samples of multiple columns and left-side neighboring samples of multiple rows. Alternatively, the neighboring reference samples of the current block may also include a total of nH number of samples adjacent to a right-side boundary of the current block having a size of nW×nH, a total of nW number of samples adjacent to a bottom-side boundary of the current block, and one sample adjacent to a bottom-right side of the current block.

However, among the neighboring reference samples of the current block, part of the neighboring reference samples may not yet be decoded or may not be available for usage. In this case, the decoder may configure the neighboring reference samples that are to be used for prediction by substituting the samples that are not available for usage with samples that are available for usage. Alternatively, the decoder may configure the neighboring reference samples that are to be used for prediction by performing interpolation on the samples that are available for usage.

When the neighboring reference samples are derived, prediction samples may be induced based on an average or interpolation of the neighboring reference samples of the current block, and (ii) the prediction samples may be induced based on reference samples that are present along a specific (prediction) direction for a prediction sample, among the neighboring reference samples of the current block. The case of (i) may also be referred to as a non-directional mode or a non-angular mode, and the case of (ii) may also be referred to as a directional mode or an angular mode. Additionally, based on a prediction sample, among the neighboring reference samples of the current block, the prediction sample may be generated through an interpolation between the second neighboring sample and the first neighboring sample located at an opposite direction of the prediction direction of the intra prediction mode of the current block. The above-described case may also be referred to as a Linear interpolation intra prediction (LIP). Moreover, chroma prediction samples may be generated based on luma samples by using a linear model. This case may be referred to as an LM mode. Additionally, a temporary prediction sample may be derived based on filtered neighboring reference samples, and a prediction sample of the current block may be derived by performing a weighted sum of at least one reference sample being derived according to the intra prediction mode and the temporary prediction sample, among the existing neighboring reference samples, i.e., the non-filtered neighboring reference samples. The above-described case may be referred to as a Position dependent intra prediction (PDPC). A reference sample line having the highest accuracy, among neighboring multiple reference sample lines of the current block, may be selected, and a prediction sample may be derived by using a reference sample located along a prediction direction in the corresponding line. And, at this point, intra prediction coding may be performed by using a method of indicating (signaling) the used reference sample line to the decoding apparatus. The above-described case may also be referred to as multi-reference line (MRL) intra prediction or MRL-based intra prediction. Additionally, the current block may be divided (or partitioned) into vertical or horizontal subpartitions and, then, intra prediction may be performed based on the same intra prediction mode. Herein, neighboring reference samples may be derived and used in subpartition units. That is, in this case, the intra prediction mode for the current block may be equally applied to the subpartitions. And, herein, by deriving and using the neighboring reference samples in subpartition units, in some cases, the intra prediction performance (or capability) may be enhanced. Such prediction method may also be referred to as intra sub-partitions (ISP) or ISP-based intra prediction. The above-described intra prediction methods may be differentiated from the intra prediction mode described in Section 1.2 and may, therefore, be referred to as an intra prediction type. The intra prediction type may also be referred to by various other terms, such as intra prediction scheme or additional intra prediction mode. For example, the intra prediction type (or additional intra prediction mode, and so on) may include at least one of the above-described LIP, PDPC, MRL, ISP. A general intra prediction method excluding the specific intra prediction type, such as LIP, PDPC, MRL, ISP, and so on, may be referred to as a normal intra prediction type. The normal intra prediction type may be generally applied when the above-described specific intra prediction type is not applied, and, then, prediction may be performed based on the above-described intra prediction mode. Meanwhile, when needed, post-filtering may also be performed on the derived prediction sample.

More specifically, the intra prediction procedure may include a step of determining an intra prediction mode/type, a step of deriving a neighboring reference sample, and a step of deriving an intra prediction mode/type based prediction sample. Additionally, when needed, a step of performing post-filtering may also be performed on the derived prediction sample.

A modified reconstructed picture may be generated through the in-loop filtering procedure, and the modified reconstructed picture may be outputted as a decoded picture from the decoding apparatus. And, the modified reconstructed picture may also be stored in a decoded picture buffer or memory of the encoding apparatus/decoding apparatus so as to be used as a reference picture later on during an inter prediction procedure when encoding/decoding a picture. As described above, the in-loop filtering procedure may include a deblocking filtering procedure, a sample adaptive offset (SAO) procedure, and/or an adaptive loop filter (ALF) procedure, and so on. In this case, among the deblocking filtering procedure, the sample adaptive offset (SAO) procedure, the adaptive loop filter (ALF) procedure, and a bi-lateral filter procedure, one procedure or some procedures may be sequentially applied, or all of the procedures may be sequentially applied. For example, after applying the deblocking filtering procedure to a reconstructed picture, the SAO procedure may be performed. Alternatively, for example, after applying the deblocking filtering procedure to a reconstructed picture, the ALF procedure may be performed. This may be equally performed in the encoding apparatus.

Deblocking filtering is a filtering scheme that removes any distortion occurring at a boundary between blocks within the reconstructed picture. The deblocking filtering procedure, for example, may derive a target boundary from a reconstructed picture, determine a boundary strength (bS) for the target boundary, and perform deblocking filtering for the target boundary based on the bS. The bS may be determined based on a prediction mode of two blocks adjacent to the target boundary, a different in motion vectors, whether or not the reference picture is the same, whether or not a non-zero significant coefficient is present, and so on.

SAO is a method that compensates for an offset difference between a reconstructed picture and an original picture. And, herein, for example, the SAO may be applied based on various types, such as a Band Offset, an Edge Offset, and so on. According to the SAO, samples may be sorted by different categories in accordance with each SAO type, and an offset value may be added to each sample based on the category. Filtering information for SAO may include information on the application or non-application of the SAO, SAO type information, SAO offset value information, and so on. The SAO may also be applied to a reconstructed picture after having the deblocking filtering applied thereto.

Adaptive Loop Filter (ALF) is a filtering scheme that is performed in sample units based on filter coefficients according to a filter shape for a reconstructed picture. The encoding apparatus may determine the application or non-application of ALF, the ALF shape, and/or ALF filtering coefficient, and so on through a comparison between a reconstructed picture and an original picture, and, then, the encoding apparatus may signal the determined result to the decoding apparatus. That is, the filtering information for ALF may include ALF filter shape information, ALF filtering coefficient information, and so on. ALF may be applied to the reconstructed picture after application of the deblocking filtering.

Figure 5:
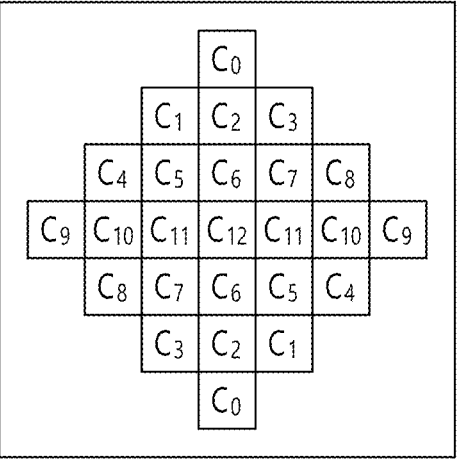
FIG. 5 shows an example of an ALF filter shape.
Figure 5:
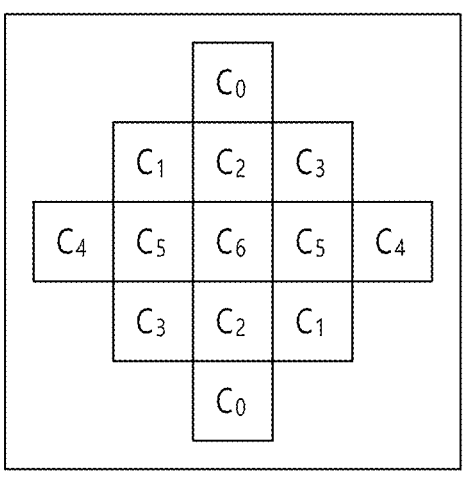

FIG. 5 shows an example of an ALF filter shape.

(a) of FIG. 5 shows a 7×7 diamond filter shape, and (b) of FIG. 5 shows a 5×5 diamond filter shape. Cn within the filter shape shown in FIG. 5 represents a filter coefficient. When the value of n in Cn is the same, this indicates that a same filter coefficient may be allocated. In the present disclosure, a position and/or unit for allocating a filter coefficient according to the filter shape of ALF may be referred to as a filter tab. At this point, one filter coefficient may be allocated to each filter tab, and an arrangement form of the filter tab may correspond to the filter shape. A filter tab that is located at a center of a filter shape may be referred to as a center filter tab. A same filter coefficient may be allocated to two filter tabs of an equal n value that is present in locations symmetrical to one another based on the center filter tab. For example, in the 7×7 diamond filter shape, since 25 filter tabs are included and filter coefficients C0 to C11 are allocated in a central symmetric structure, filter coefficients may be allocated to the 13 filter tabs by using only 7 filter coefficients. For example, in order to reduce the amount of data of information related to a signaled filter coefficient, among the 13 filter coefficients for the 7×7 diamond filter shape, 12 filter coefficients may be (explicitly) signaled, and one filter coefficient may be (implicitly) derived. Additionally, for example, among the 7 filter coefficients for the 5×5 diamond filter shape, 6 filter coefficients may be (explicitly) signaled, and one filter coefficient may be (implicitly) derived.

In an example, prior to the application of a filter, a geometric transformation may be applied to filter coefficients and the corresponding clipping values based on gradient values that are calculated for a corresponding block. The geometric transformation may include rotation, diagonal flipping, or vertical flipping.

The following equations show filter coefficients having transformation (or transform) for each direction (diagonal, vertical, rotational) and clipping values. In the equations shown below, K is a filter size, and k and l represent coefficient coordinates. For example, k may be greater than or equal to 0, and l may be less than or equal to K−1. Position (0, 0) may be a top-left corner, and position (K−1, K−1) may be a bottom-right corner. The transformations (or transforms) may be applied to filter coefficients f(k, l) and clipping values c(k, l) based on gradient values that are calculated for the corresponding block.

$$\text{Diagonal: } f\_D(k, l) = f(l, k), c\_D(k, l) = c(l, k) \qquad \text{[Equation 1]}$$

$$\text{Vertical flip: } f\_V(k, l) = f(k, K-l-1), \qquad \text{[Equation 2]}$$
$$c\_V(k, l) = c(k, K-l-1)$$

$$\text{Rotation: } f\_R(k, l) = f(k, K-l-1), \qquad \text{[Equation 3]}$$
$$c\_R(k, l) = c(K-l-1, k)$$

The following table shows an exemplary relationship between gradient values $(g_h, g_v, g_{d1}, g_{d2})$ of four directions and transformation that is applied to the current block.

TABLE 3

| Gradient values | Transformation |
| --- | --- |
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

In order to reduce a bit overhead, a combination of filter coefficients of different categories of a luma component is needed. ALF filter parameters may be signaled in an APS and/or slice header. For example, in one APS, luma filter coefficients and clipping value indexes of a maximum of 25 sets may be signaled, and chroma filter coefficients and clipping value indexes of a maximum of 8 sets may be signaled. In a slice header, indexes of APSs that are used for the current slice may be signaled.

Clipping value indexes that are decoded from the APS may be used for determining clipping values together with clipping values of a luma table and clipping values of a chroma table. Such clipping values may be based on an internal bitdepth.

In an example, a luma table of the clipping values and a chroma table of the clipping tables may be derived based on the following equations. In the equations shown below, B represents an internal bitdepth, and N may be a number of clipping values. For example, N may be equal to 4.

$$AlfClipL = \{\text{round}(2^{\wedge}(B(N - n + 1)/N)) \text{ for } n \in [1 \dots N]\} \quad [\text{Equation 4}]$$

$$AlfClipC = \quad [\text{Equation 5}]$$
$$\{\text{round}(2^{\wedge}((B - 8) + 8 ((N - n)/N - 1)) \text{ for } n \in [1 \dots N]\}$$

As an example, in order to indicate luma filter sets that are using in a current slice, the slice header may signal a maximum of 7 APS indexes. A filtering procedure may be further controlled in a CTB level. A flag indicating whether or not ALF is applied to a luma CTB may always be signaled. A luma CTB may select a filter set from 16 fixed filter sets and filter sets of the APSs. In order to indicate which filter set is being applied, a filter set index for the CTB may be signaled. The 16 fixed filter sets may be pre-defined and hard-coded in both the encoder and the decoder.

In case of a chroma configuration element, an APS index may be signaled in the slice header in order to indicate chroma filter sets that are used for the current slice. In a CTB level, filter indexes may be signaled for each chroma CTB when two or more chroma filter sets are present in an APS.

In order to further limit (or restrict) multiplication complexity, bitstream conformance is applied, thereby allowing coefficient values of a non-central position to be within a range of 0~28 and allowing coefficient values of the remaining positions to be within a range of −27 to 27-1. A central position coefficient is not signaled in a bitstream and may be inferred to be equal to 128.

When an ALF is available for usage for a current CTB, each R(i,j) within a CU may be filtered, thereby enabling R'(i,j) to be calculated. For example, R'(i,j) may be calculated based on the following equation. f(k,l) may be filter coefficients, and K(x,y) may be a clipping function. Additionally, c(k,l) may be decoded clipping parameters. k and l may vary between −L/2 and L/2, and, herein, L may be a filter length. A clipping function K(x,y)=min(y,max(−y,x)) may also be represented as Clip3(−y,y,x).

$$R'(i, j) = R(i, j) + \quad [\text{Equation 6}]$$
$$\left(\left(\sum_{k \neq 0} \sum_{l \neq 0} f(k, l) \times K(R(i + k, j + l) - R(i, j), c(k, l)) + 64\right) \gg 7\right)$$

As described above, an in-loop filtering procedure may be applied to a reconstructed picture. In this case, a virtual boundary is defined in order to enhance the subjective/ objective visual quality of a reconstructed picture, and the in-loop filtering procedure may be applied across the virtual boundary. The virtual boundary may, for example, include a non-continuous edge, such as a 360-degree image, a VR image, or a picture in picture (PIP), and so on. For example, the virtual boundary may be present in a predetermined position, or its presence or absence and/or its position may be signaled. For example, the virtual boundary may be located in a top $4^{th}$ sample line of the CTU row (more specifically, for example, an upper part of the top $4^{th}$ sample line of the CTU row). As another example, information related to the presence or absence and/or the position of the virtual boundary may be signaled through HLS. As described above, the HLS may include an SPS, a PPS, a picture header, a slice header, and so on.

Hereinafter, high-level syntax signaling and semantics related to the embodiments of the present specification.

An embodiment of the present specification may include a method for controlling loop filters. The method for controlling loop filters may be applied for a reconstructed picture. In-loop filters (loop filters) may be used for decoding encoded bitstreams. Loop filters may include the above-described deblocking, SAO, and ALF. SPS may include flags related to each of the deblocking, SAO, and ALF. The flags may indicate whether or not each tool is available for usage for coding a coded layer video sequence (CLVS) and a coded video sequence (CVS), which refer to the SPS.

In an example, when loop filters are available for usage for coding pictures within a CVS, the application of the loop filters may be controlled so that the loop filters are not applied across specific boundaries. For example, the loop filters may be controlled not to cross subpicture boundaries, the loop filters may be controlled bot to cross tile boundaries, the loop filters may be controlled not to cross slice boundaries, and/or the loop filters may be controlled not to cross virtual boundaries.

Information related to in-loop filtering may include information, syntax, syntax elements, and/or semantics that are described in the present specification (or embodiments included in the present specification). The information related to in-loop filtering may include information related to whether or not (all or part of) the in-loop filtering procedure is available for usage across specific boundaries (e.g., virtual boundary, subpicture boundary, slice boundary and/or tile boundary). Image information included in a bitstream may include high level syntax (HLS), and the HLS may include information related to the in-loop filtering. Modified (or filtered) reconstructed samples (reconstructed pictures) may be generated based on a determination on whether or not the in-loop filtering is applied across specific boundaries. In an example, if the in-loop filtering procedure is disabled for all blocks/boundaries, the modified reconstructed samples may be the same as reconstructed samples. In another example, the modified reconstructed samples may include modified reconstructed samples that are derived based on in-loop filtering. However, in this case, based on the determined result, among the reconstructed samples, part (e.g., reconstructed samples across the virtual boundary) may not be processed with in-loop filtering. For example, although the reconstructed samples across specific boundaries (which include at least one of a virtual boundary enabled to perform in-loop filtering, a subpicture boundary, a slice boundary, and/or a tile boundary) may be processed within in-loop filtering, reconstructed samples across other boundaries (which include at least one of a virtual boundary disabled to perform in-loop filtering, a subpicture boundary, a slice boundary, and/or a tile boundary) may not be processed within in-loop filtering.

In an example, in relation with whether or not the in-loop filtering procedure is performed across the virtual boundaries, information related to in-loop filtering may include an SPS virtual boundaries present flag, a picture header virtual boundaries present flag, information related to a number of virtual boundaries, information on positions of the virtual boundaries, and so on.

In the embodiments included in the present specification, the information related to the positions of the virtual boundaries may include information on an x coordinate of a vertical virtual boundary and/or a y coordinate of a horizontal virtual boundary. More specifically, the information related to the positions of the virtual boundaries may include an x coordinate of a vertical virtual boundary in luma sample units and/or a y coordinate of a horizontal virtual boundary in luma sample units. Additionally, information related to the positions of the virtual boundaries may include information on a number of information (syntax elements) related to an x coordinate of a vertical virtual boundary that is present in an SPS. Additionally, information related to the positions of the virtual boundaries may include information on a number of information (syntax elements) related to a y coordinate of a horizontal virtual boundary that is present in an SPS. Alternatively, information related to the positions of the virtual boundaries may include information on a number of information (syntax elements) related to an x coordinate of a vertical virtual boundary that is present in a picture header. Additionally, information related to the positions of the virtual boundaries may include information on a number of information (syntax elements) related to a y coordinate of a horizontal virtual boundary that is present in a picture header.

The following tables show exemplary syntax and semantics of a sequence parameter set (SPS) according to the present embodiment.

TABLE 4

|  | Descriptor |
| --- | --- |
| seq_parameter_set_rbsp( ) { | |
| ... | |
|   subpics_present_flag | u(1) |
|   if( subpics_present_flag ) { | |
|     sps_num_subpics_minus1 | u(8) |
|     for( i = 0; i <= sps_num_subpics_minus1; i++ ) { | |
|       subpic_ctu_top_left_x[ i ] | u(v) |
|       subpic_ctu_top_left_y[ i ] | u(v) |
|       subpic_width_minus1[ i ] | u(v) |
|       subpic_height_minus1[ i ] | u(v) |
|       subpic_treated_as_pic_flag[ i ] | u(1) |
|       loop_filter_across_subpic_enabled_flag[ i ] | u(1) |
|     } | |
|   } | |
| ... | |
|   sps_sao_enabled_flag | u(1) |
|   sps_alf_enabled_flag | u(1) |
| ... | |
|   sps_loop_filter_across_virtual_boundaries_disabled_present_flag | u(1) |
|   if( sps_loop_filter_across_virtual_boundaries_disabled_present_flag ) { | |
|     sps_num_ver_virtual_boundaries | u(2) |
|     for( i = 0; i < sps_num_ver_virtual_boundaries; i++ ) | |
|       sps_virtual_boundaries_pos_x[ i ] | u(13) |
|     sps_num_hor_virtual_boundaries | u(2) |
|     for( i = 0; i < sps_num_hor_virtual_boundaries; i++ ) | |
|       sps_virtual_boundaries_pos_y[ i ] | u(13) |
|   } | |
| ... | |
| } | |

45

TABLE 5 subpics_present_flag equal to 1 specifies that subpicture parameters are present in in the SPS RBSP syntax.
subpics_present_flag equal to 0 specifies that subpicture parameters are not present in the SPS RBSP syntax.
sps_num_subpics_minus1 plus 1 specifies the number of subpictures. sps_num_subpics_minus1 shall be in the range of 0 to 254. When not present, the value of sps_num_subpics_minus1 is inferred to be equal to 0.
subpic_ctu_top_left_x[ i ] specifies horizontal position of top left CTU of i-th subpicture in unit of CtbSizeY. The length of the syntax element is Ceil( Log2( pic_width_max_in_luma_samples / CtbSizeY ) ) bits. When not present, the value of subpic_ctu_top_left_x[ i ] is inferred to be equal to 0.
subpic_ctu_top_left_y[ i ] specifies vertical position of top left CTU of i-th subpicture in unit of CtbSizeY. The length of the syntax element is Ceil( Log2( pic_height_max_in_luma_samples / CtbSizeY ) ) bits. When not present, the value of subpic_ctu_top_left_y[ i ] is inferred to be equal to 0.
subpic_width_minus1[ i ] plus 1 specifies the width of the i-th subpicture in units of CtbSizeY. The length of the syntax element is Ceil( Log2( pic_width_max_in_luma_samples / CtbSizeY ) ) bits. When not present, the value of subpic_width_minus1[ i ] is inferred to be equal to Ceil( pic_width_max_in_luma_samples / CtbSizeY ) − 1.
subpic_height_minus1[ i ] plus 1 specifies the height of the i-th subpicture in units of CtbSizeY. The length of the syntax element is Ceil( Log2( pic_height_max_in_luma_samples / CtbSizeY ) ) bits. When not present, the value of subpic_height_minus1[ i ] is inferred to be equal to Ceil( pic_height_max_in_luma_samples / CtbSizeY ) − 1.
subpic_treated_as_pic_flag[ i ] equal to 1 specifies that the i-th subpicture of each coded picture in the CLVS is treated as a picture in the decoding process excluding in-loop filtering operations. subpic_treated_as_pic_flag[ i ] equal to 0 specifies that the i-th subpicture of each coded picture in the CLVS is not treated as a picture in the decoding process excluding in-loop filtering operations. When not present, the value of subpic_treated_as_pic_flag[ i ] is inferred to be equal to 0.

TABLE 5-continued loop_filter_across_subpic_enabled_flag[ i ] equal to 1 specifies that in-loop filtering operations may be performed across the boundaries of the i-th subpicture in each coded picture in the CLVS. loop_filter_across_subpic_enabled_flag[ i ] equal to 0 specifies that in-loop filtering operations are not performed across the boundaries of the i-th subpicture in each coded picture in the CLVS. When not present, the value of loop_filter_across_subpic_enabled_pic_flag[ i ] is inferred to be equal to 1.
sps_loop_filter_across_virtual_boundaries_disabled_present_flag equal to 1 specifies that the in-loop filtering operations are disabled across the virtual boundaries in pictures referring to the SPS.
sps_loop_filter_across_virtual_boundaries_disabled_present_flag equal to 0 specifies that no such disabling of in-loop filtering operations is applied in pictures referring to the SPS. In-loop filtering operations include the deblocking filter, sample adaptive offset filter, and adaptive loop filter operations.
sps_sao_enabled_flag equal to 1 specifies that the sample adaptive offset process is applied to the reconstructed picture after the deblocking filter process. sps_sao_enabled_flag equal to 0 specifies that the sample adaptive offset process is not applied to the reconstructed picture after the deblocking filter process.
sps_alf_enabled_flag equal to 0 specifies that the adaptive loop filter is disabled. sps_alf_enabled_flag equal to 1 specifies that the adaptive loop filter is enabled.
sps_num_ver_virtual_boundaries specifies the number of sps_virtual_boundaries_pos_x[ i ] syntax elements that are present in the SPS. When sps_num_ver_virtual_boundaries is not present, it is inferred to be equal to 0.
sps_virtual_boundaries_pos_x[ i ] is used to compute the value of VirtualBoundariesPosX[ i ], which specifies the location of the i-th vertical virtual boundary in units of luma samples. The value of sps_virtual_boundaries_pos_x[ i ] shall be in the range of 1 to Ceil( pic_width_in_luma_samples ÷ 8 ) − 1, inclusive.
sps_num_hor_virtual_boundaries specifies the number of sps_virtual_boundaries_pos_y[ i ] syntax elements that are present in the SPS. When sps_num_hor_virtual_boundaries is not present, it is inferred to be equal to 0.
sps_virtual_boundaries_pos_y[ i ] is used to compute the value of VirtualBoundariesPosY[ i ], which specifies the location of the i-th horizontal virtual boundary in units of luma samples. The value of sps_virtual_boundaries_pos_y[ i ] shall be in the range of 1 to Ceil( pic_height_in_luma_samples ÷ 8 ) − 1, inclusive.

The following tables show exemplary syntax and semantics of a picture parameter set (PPS) according to the present embodiment.

TABLE 6

| | Descriptor |
|---|---|
| pic_parameter_set_rbsp( ) { | |
| ... | |
| no_pic_partition_flag | u(1) |
| if( !no_pic_partition_flag ) { | |
| ... | |
| loop_filter_across_tiles_enabled_flag | u(1) |
| loop_filter_across_slices_enabled_flag | u(1) |
| } | |
| ... | |

TABLE 6-continued

| | Descriptor |
|---|---|
| deblocking_filter_control_present_flag | u(1) |
| if( deblocking_filter_control_present flag ) { | |
| deblocking_filter_override_enabled_flag | u(1) |
| pps_deblocking_filter_disabled_flag | u(1) |
| if( !pps_deblocking_filter_disabled flag ) { | |
| pps_beta_offset_div2 | se(v) |
| pps_tc_offset_div2 | se(v) |
| } | |
| } | |
| ... | |
| } | |

TABLE 7 no_pic_partition_flag equal to 1 specifies that no picture partitioning applied to each picture referring to the PPS. no_pic_partition_flag equal to 0 specifies each picture referring to the PPS may be partitioned into more than one tile or slice.
loop_filter_across_tiles_enabled_flag equal to 1 specifies that in-loop filtering operations may be performed across tile boundaries in pictures referring to the PPS. loop_filter_across_tiles_enabled_flag equal to 0 specifics that in-loop filtering operations are not performed across tile boundaries in pictures referring to the PPS. The in-loop filtering operations include the deblocking filter, sample adaptive offset filter, and adaptive loop filter operations.
loop_filter_across_slices_enabled_flag equal to 1 specifies that in-loop filtering operations may be performed across slice boundaries in pictures referring to the PPS. loop_filter_across_slice_enabled_flag equal to 0 specifies that in-loop filtering operations are not performed across slice boundaries in pictures referring to the PPS. The in-loop filtering operations include the deblocking filter, sample adaptive offset filter, and adaptive loop filter operations.
deblocking_filter_control_present_flag equal to 1 specifies the presence of deblocking filter control syntax elements in the PPS. deblocking_filter_control_present_flag equal to 0 specifies the absence of deblocking filter control syntax elements in the PPS.
deblocking_filter_override_enabled_flag equal to 1 specifies the presence of pic_deblocking_filter_override_flag in the PHs referring to the PPS or slice_deblocking_filter_override_flag in the slice headers referring to the PPS. deblocking_filter_override_enabled_flag equal to 0 specifies the absence of pic_deblocking_filter_override_flag in PHs referring to the PPS or slice_deblocking_filter_override_flag in slice headers referring to the PPS. When not present, the value of deblocking_filter_override_enabled_flag is inferred to be equal to 0.
pps_deblocking_filter_disabled_flag equal to 1 specifies that the operation of deblocking filter is not applied for slices referring to the PPS in which slice_deblocking_filter_disabled_flag is not present. pps_deblocking_filter_disabled_flag equal to 0 specifies that the operation of the deblocking filter is applied for slices referring to the PPS in which slice_deblocking_filter_disabled_flag is not present. When not present, the value of pps_deblocking_filter_disabled_flag is inferred to be equal to 0.
pps_beta_offset_div2 and pps_tc_offset_div2 specify the default deblocking parameter offsets for β and tC (divided by 2) that are applied for slices referring to the PPS, unless the default deblocking parameter offsets are overridden by the deblocking parameter offsets present in the slice headers of the slices referring to the PPS. The values of pps_beta_offset_div2 and pps_tc_offset_div2 shall both be in the range of −6 to 6, inclusive. When not present, the value of pps_beta_offset_div2 and pps_tc_offset_div2 are inferred to be equal to 0.

The following tables show exemplary syntax and semantics of a picture header according to the present embodiment.

TABLE 8

|  | Descriptor |
|---|---|
| picture_header_rbsp( ) { | |
|    ... | |
|    if( !sps_loop_filter_across_virtual_boundaries_disabled_present_flag ) { | |
|       ph_loop_filter_across_virtual_boundaries_disabled_present_flag | u(1) |
|       if( ph_loop_filter_across_virtual_boundaries_disabled_present_flag ) { | |
|          ph_num_ver_virtual_boundaries | u(2) |
|          for( i = 0; i < ph_num_ver_virtual_boundaries; i++ ) | |
|             ph_virtual_boundaries_pos_x[ i ] | u(13) |
|          ph_num_hor_virtual_boundaries | u(2) |
|          for( i = 0; i < ph_num_hor_virtual_boundaries; i++ ) | |
|             ph_virtual_boundaries_pos_y[ i ] | u(13) |
|       } | |
|    } | |
|    ... | |
|    if( sps_sao_enabled_flag ) { | |
|       pic_sao_enabled_present_flag | u(1) |
|       if( pic_sao_enabled_present_flag ) { | |
|          pic_sao_luma_enabled_flag | u(1) |
|          if(ChromaArrayType != 0 ) | |
|             pic_sao_chroma_enabled_flag | u(1) |
|       } | |
|    } | |
|    if( sps_alf_enabled_flag ) { | |
|       pic_alf_enabled_present_flag | u(1) |
|       if( pic_alf_enabled_present_flag ) { | |
|          pic_alf_enabled_flag | u(1) |
|          if( pic_alf_enabled_flag ) { | |
|             pic_num_alf_aps_ids_luma | u(3) |
|             for( i = 0; i < pic_num_alf_aps_ids_luma; i++ ) | |
|                pic_alf_aps_id_luma[ i ] | u(3) |
|             if( ChromaArrayType != 0 ) | |
|                pic_alf_chroma_idc | u(2) |
|             if( pic_alf_chroma_idc ) | |
|                pic_alf_aps_id_chroma | u(3) |
|          } | |
|       } | |
|    } | |
|    ... | |
|    if( deblocking_filter_override_enabled_flag ) { | |
|       pic_deblocking_filter_override_present_flag | u(1) |
|       if( pic_deblocking_filter_override_present_flag ) { | |
|          pic_deblocking_filter_override_flag | u(1) |
|          if( pic_deblocking_filter_override_flag ) { | |
|             pic_deblocking_filter_disabled_flag | u(1) |
|             if( !pic_deblocking_filter_disabled_flag ) { | |
|                pic_beta_offset_div2 | se(v) |
|                pic_tc_offset_div2 | se(v) |
|             } | |
|          } | |
|       } | |
|    } | |
|    ... | |
| } | |

TABLE 9 ph_loop_filter_across_virtual_boundaries_disabled_present_flag equal to 1 specifies that the in-loop filtering operations are disabled across the virtual boundaries in pictures associated to the PH.

ph_loop_filter_across_virtual_boundaries_disabled_—present_flag equal to 0 specifies that no such disabling of in-loop filtering operations is applied in pictures associated to the PH. The in-loop filtering operations include the deblocking filter, sample adaptive offset filter, and adaptive loop filter operations.

ph_num_ver_virtual_boundaries specifies the number of ph_virtual_boundaries_pos_x[ i ] syntax elements that are present in the PH.

ph_virtual_boundaries_pos_x[ i ] is used to compute the value of VirtualBoundariesPosX[ i ], which specifies the location of the i-th vertical virtual boundary in units of luma samples. The value of ph_virtual_boundaries_pos_x[ i ] shall be in the range of 1 to Ceil( pic_width_in_luma_samples ÷ 8 ) − 1, inclusive.

ph_num_hor_virtual_boundaries specifies the number of ph_virtual_boundaries_pos_y[ i ] syntax elements that are present in the PH.

ph_virtual_boundaries_pos_y[ i ] is used to compute the value of VirtualBoundariesPosY[ i ], which specifies the location of the i-th horizontal virtual boundary in units of luma samples. The value of ph_virtual_boundaries_pos_y[ i ] shall be in the range of 1 to Ceil( pic_height_in_luma_samples ÷ 8 ) − 1, inclusive.

TABLE 9-continued pic_sao_enabled_present_flag equal to 1 specifies that pic_sao_luma_flag and pic_sao_chroma_flag are present in the
PH. pic_sao_enabled_present_flag equal to 0 specifies that pic_sao_luma_flag and pic_sao_chroma_flag are not present
in the PH. When pic_sao_enabled_present_flag is not present, it is inferred to be equal to 0.
pic_sao_luma_enabled_flag equal to 1 specifies that SAO is enabled for the luma component in all slices associated with
the PH; pic_sao_luma_enabled_flag equal to 0 specifies that SAO for the luma component may be disabled for one, or
more, or all slices associated with the PH.
pic_sao_chroma_enabled_flag equal to 1 specifies that SAO is enabled for the chroma component in all slices associated
with the PH; pic_sao_chroma_enabled_flag equal to 0 specifies that SAO for chroma component may be disabled for
one, or more, or all slices associated with the PH.
pic_alf_enabled_present_flag equal to 1 specifies that pic_alf_enabled_flag, pic_num_alf_aps_ids_luma,
pic_alf_aps_id_luma[ i ], pic_alf_chroma_idc, and pic_alf_aps_id_chroma are present in the PH.
pic_alf_enabled_present_flag equal to 0 specifies that pic_alf_enabled_flag, pic_num_alf_aps_ids_luma,
pic_alf_aps_id_luma[ i ], pic_alf_chroma_idc, and pic_alf_aps_id_chroma are not present in the PH. When
pic_alf_enabled_present_flag is not present, it is inferred to be equal to 0.
pic_alf_enabled_flag equal to 1 specifies that adaptive loop filter is enabled for all slices associated with the PH and may
be applied to Y, Cb, or Cr colour component in the slices. pic_alf_enabled_flag equal to 0 specifies that adaptive loop
filter may be disabled for one, or more, or all slices associated with the PH. When not present, pic_alf_enabled_flag is
inferred to be equal to 0.
pic_num_alf_aps_ids_luma specifies the number of ALF APSs that the slices associated with the PH refers to.
pic_alf_aps_id_luma[ i ] specifies the adaptation_parameter_set_id of the i-th ALF APS that the luma component of the
slices associated with the PH refers to.
The value of alf_luma_filter_signal_flag of the APS NAL unit having aps_params_type equal to ALF_APS and
adaptation_parameter_set_id equal to pic_alf_aps_id_luma[ i ] shall be equal to 1.
pic_alf_chroma_idc equal to 0 specifies that the adaptive loop filter is not applied to Cb and Cr colour components.
pic_alf_chroma_idc equal to 1 indicates that the adaptive loop filter is applied to the Cb colour component.
pic_alf_chroma_idc equal to 2 indicates that the adaptive loop filter is applied to the Cr colour component.
pic_alf_chroma_idc equal to 3 indicates that the adaptive loop filter is applied to Cb and Cr colour components. When
pic_alf_chroma_idc is not present, it is inferred to be equal to 0.
pic_alf_aps_id_chroma specifies the adaptation_parameter_set_id of the ALF APS that the chroma component of the
slices associated with the PH refers to.
pic_deblocking_filter_override_present_flag equal to 1 specifics that pic_deblocking_filter_override_flag is present in the
PH. pic_deblocking_filter_override_present_flag equal to 0 specifies that pic_deblocking_filter_override_flag is not
present in the PH. When pic_deblocking_filter_override_present_flag is not present, it is inferred to be equal to 0.
pic_deblocking_filter_override_flag equal to 1 specifies that deblocking parameters are present in the PH.
pic_deblocking_filter_override_flag equal to 0 specifies that deblocking parameters are not present in the PH. When not
present, the value of pic_pic_deblocking_filter_override_flag is inferred to be equal to 0.
pic_deblocking_filter_disabled_flag equal to 1 specifies that the operation of the deblocking filter is not applied for the
slices associated with the PH. pic_deblocking_filter_disabled_flag equal to 0 specifies that the operation of the
deblocking filter is applied for the slices associated with the PH. When pic_deblocking_filter_disabled_flag is not
present, it is inferred to be equal to pps_deblocking_filter_disabled_flag.
pic_beta_offset_div2 and pic_tc_offset_div2 specify the deblocking parameter offsets for $\beta$ and tC (divided by 2) for the
slices associated with the PH. The values of pic_beta_offset_div2 and pic_tc_offset_div2 shall both be in the range of −6
to 6, inclusive. When not present, the values of pic_beta_offset_div2 and pic_tc_offset_div2 are inferred to be equal to
pps_beta_offset_div2 and pps_tc_offset_div2, respectively.

The following tables show exemplary syntax and seman-
tics of a slice header according to the present embodiment.

TABLE 10

| | Descriptor |
|---|---|
| slice_header( ) { | |
| ... | |
|   if( pps_cu_chroma_qp_offset_list_enabled_flag ) | |
|     cu_chroma_qp_offset_enabled_flag | u(1) |
|   if( sps_sao_enabled_flag && !pic_sao_enabled_present_flag ) { | |
|     slice_sao_luma_flag | u(1) |
|     if( ChromaArrayType != 0 ) | |
|       slice_sao_chroma_flag | u(1) |
|   } | |
|   if( sps_alf_enabled_flag && !pic_alf_enabled_present_flag ) { | |
|     slice_alf_enabled_flag | u(1) |
|     if( slice_alf_enabled_flag ) { | |
|       slice_num_alf_aps_ids_luma | u(3) |
|       for( i = 0; i < slice_num_alf_aps_ids_luma; i++ ) | |
|         slice_alf_aps_id_luma[ i ] | u(3) |
|       if( ChromaArrayType != 0 ) | |
|         slice_alf_chroma_idc | u(2) |
|       if( slice_alf_chroma_idc ) | |
|         slice_alf_aps_id_chroma | u(3) |
|     } | |
|   } | |
|   if( deblocking_filter_override_enabled_flag && | |
|       !pic_deblocking_filter_override_present_flag ) | |
|     slice_deblocking_filter_override_flag | u(1) |
|   if( slice_deblocking_filter_override_flag ) { | |

TABLE 10-continued

| | Descriptor |
|---|---|
| slice_deblocking_filter_disabled_flag | u(1) |
| if( !slice_deblocking_filter_disabled_flag ) { | |
| slice_beta_offset_div2 | se(v) |
| slice_tc_offset_div2 | se(v) |
| } | |
| } | |
| ... | |
| } | |

TABLE 11 cu_chroma_qp_offset_enabled_flag equal to 1 specifies that the cu_chroma_qp_offset_flag may be present in the transform unit and palette coding syntax. cu_chroma_qp_offset_enabled_flag equal to 0 specifies that the cu_chroma_qp_offset_flag is not present in the transform unit or palette coding syntax. When not present, the value of cu_chroma_qp_offset_enabled_flag is inferred to be equal to 0.
slice_sao_luma_flag equal to 1 specifies that SAO is enabled for the luma component in the current slice; slice_sao_luma_flag equal to 0 specifies that SAO is disabled for the luma component in the current slice. When slice_sao_luma_flag is not present, it is inferred to be equal to pic_sao_luma_enabled_flag.
slice_sao_chroma_flag equal to 1 specifies that SAO is enabled for the chroma component in the current slice; slice_sao_chroma_flag equal to 0 specifies that SAO is disabled for the chroma component in the current slice. When slice_sao_chroma_flag is not present, it is inferred to be equal to pic_sao_chroma_enabled_flag.
slice_alf_enabled_flag equal to 1 specifies that adaptive loop filter is enabled and may be applied to Y, Cb, or Cr colour component in a slice. slice_alf_enabled_flag equal to 0 specifies that adaptive loop filter is disabled for all colour components in a slice. When not present, the value of slice_alf_enabled_flag is inferred to be equal to pic_alf_enabled_flag.
slice_num_alf_aps_ids_luma specifies the number of ALF APSs that the slice refers to. When slice_alf_enabled_flag is equal to 1 and slice_num_alf_aps_ids_luma is not present, the value of slice_num_alf_aps_ids_luma is inferred to be equal to the value of pic_num_alf_aps_ids_luma.
slice_alf_aps_id_luma[ i ] specifies the adaptation_parameter_set_id of the i-th ALF APS that the luma component of the slice refers to. The TemporalId of the APS NAL unit having aps_params_type equal to ALF_APS and adaptation_parameter_set_id equal to slice_alf_aps_id_luma[ i ] shall be less than or equal to the TemporalId of the coded slice NAL unit. When slice_alf_enabled_flag is equal to 1 and slice_alf_aps_id_luma[ i ] is not present, the value of slice_alf_aps_id_luma[ i ] is inferred to be equal to the value of pic_alf_aps_id_luma[ i ].
The value of alf_luma_filter_signal_flag of the APS NAL unit having aps_params_type equal to ALF_APS and adaptation_parameter_set_id equal to slice_alf_aps_id_luma[ i ] shall be equal to 1.
slice_alf_chroma_idc equal to 0 specifies that the adaptive loop filter is not applied to Cb and Cr colour components. slice_alf_chroma_idc equal to 1 indicates that the adaptive loop filter is applied to the Cb colour component. slice_alf_chroma_idc equal to 2 indicates that the adaptive loop filter is applied to the Cr colour component. slice_alf_chroma_idc equal to 3 indicates that the adaptive loop filter is applied to Cb and Cr colour components. When slice_alf_chroma_idc is not present, it is inferred to be equal to pic_alf_chroma_idc.
slice_alf_aps_id_chroma specifies the adaptation_parameter_set_id of the ALF APS that the chroma component of the slice refers to. The TemporalId of the APS NAL unit having aps_params_type equal to ALF_APS and adaptation_parameter_set_id equal to slice_alf_aps_id_chroma shall be less than or equal to the TemporalId of the coded slice NAL unit. When slice_alf_enabled_flag is equal to 1 and slice_alf_aps_id_chroma is not present, the value of slice_alf_aps_id_chroma is inferred to be equal to the value of pic_alf_aps_id_chroma.
The value of alf_chroma_filter_signal_flag of the APS NAL unit having aps_params_type equal to ALF_APS and adaptation_parameter_set_id equal to slice_alf_aps_id_chroma shall be equal to 1.
slice_deblocking_filter_override_flag equal to 1 specifies that deblocking parameters are present in the slice header. slice_deblocking_filter_override_flag equal to 0 specifies that deblocking parameters are not present in the slice header. When not present, the value of slice_deblocking_filter_override_flag is inferred to be equal to pic_deblocking_filter_override_flag.
slice_deblocking_filter_disabled_flag equal to 1 specifies that the operation of the deblocking filter is not applied for the current slice. slice_deblocking_filter_disabled_flag equal to 0 specifies that the operation of the deblocking filter is applied for the current slice. When slice_deblocking_filter_disabled_flag is not present, it is inferred to be equal to pic_deblocking_filter_disabled_flag.
slice_beta_offset_div2 and slice_tc_offset_div2 specify the deblocking parameter offsets for β and tC (divided by 2) for the current slice. The values of slice_beta_offset_div2 and slice_tc_offset_div2 shall both be in the range of −6 to 6, inclusive. When not present, the values of slice_beta_offset_div2 and slice_tc_offset_div2 are inferred to be equal to pic_beta_offset_div2 and pic_tc_offset_div2, respectively.

Hereinafter, signaling of information related to ALF filter coefficients will be described.

In the conventional ALF procedure, a k-th order exponential Golomb code, wherein k=3, is used for signaling absolute values of luma and chroma ALF coefficients. However, k-th order exponential Golomb coding is disadvantageous in that it causes considerable operational overhead and degree of complexity.

The embodiments that will be described in the following paragraphs may propose solutions for resolving the above-described problems. The embodiments may be independently applicable. Alternatively, at least two or more embodiments may be applicable in combination.

The following table shows exemplary syntax of an adaptation parameter set (APS) according to the embodiments of the present specification.

TABLE 12

| | Descriptor |
|---|---|
| adaptation_parameter_set_rbsp( ) { | |
| adaptation_parameter_set_id | u(5) |
| aps_params_type | u(3) |
| if( aps_params_type = = ALF_APS ) | |
| alf_data( ) | |
| else if( aps_params_type = = LMCS_APS ) | |
| lmcs_data( ) | |
| else if( aps_params_type = = SCALING_APS ) | |
| scaling_list_data( ) | |
| aps_extension_flag | u(1) |
| if( aps_extension_flag ) | |
| while( more_rbsp_data( ) ) | |
| aps_extension_data_flag | u(1) |
| rbsp_trailing_bits( ) | |
| } | |

The following table shows exemplary syntax of ALF data according to the present embodiment.

TABLE 13

| | Descriptor |
|---|---|
| alf_data( ) { | |
| ... | |
| alf_luma_coeff_abs_len_minus1 | ue(v) |
| for( sfIdx = 0; sfIdx <= | |

TABLE 13-continued

| | Descriptor |
|---|---|
| alf_luma_num_filters_signalled_minus1; sfIdx++ ) | |
| for( j = 0; j < 12; j++ ) { | |
| alf_luma_coeff_abs[ sfIdx ][ j ] | u(v) |
| if( alf_luma_coeff_abs[ sfIdx ][ j ] ) | |
| alf_luma_coeff_sign[ sfIdx ][ j ] | u(1) |
| } | |
| if( alf_luma_clip_flag ) | |
| for( sfIdx = 0; sfIdx <= | |
| alf_luma_num_filters_signalled_minus1; sfIdx++ ) | |
| for( j = 0; j < 12; j++ ) | |
| alf_luma_clip_idx[ sfIdx ][ j ] | u(2) |
| } | |
| if( alf_chroma_filter_signal_flag ) { | |
| alf_chroma_num_alt_filters_minus1 | ue(v) |
| alf_chroma_coeff_abs_len_minus1 | ue(v) |
| for( altIdx = 0; altIdx <= | |
| alf_chroma_num_alt_filters_minus1; altIdx++ ) { | |
| alf_chroma_clip_flag[ altIdx ] | u(1) |
| for( j = 0; j < 6; j++ ) { | |
| alf_chroma_coeff_abs[ altIdx ][ j ] | u(v) |
| if( alf_chroma_coeff_abs[ altIdx ][ j ] > 0 ) | |
| alf_chroma_coeff_sign[ altIdx ][ j ] | u(1) |
| } | |
| ... | |
| } | |

The following table shows exemplary semantics related to syntax elements included in the syntax.

TABLE 14 alf_luma_coeff_abs_len_minus1 plus 1 specifies the number of bits used to represent the syntax element
alf_luma_coeff_abs[ sfIdx ][ j ]. The value of alf_luma_abs_len_minus1 shall be in the range of 0 to 15,
inclusive.
alf_luma_coeff_abs[ sfIdx ][ j ] specifies the absolute value of the j-th coefficient of the signalled luma filter
indicated by sfIdx. When alf_luma_coeff_abs[ sfIdx ][ j ] is not present, it is inferred to be equal 0.
alf_luma_coeff_sign[ sfIdx ][ j ] specifies the sign of the j-th luma coefficient of the filter indicated by sfIdx
as follows:
- If alf_luma_coeff_sign[ sfIdx ][ j ] is equal to 0, the corresponding luma filter coefficient has a positive value.
- Otherwise (alf_luma_coeff_sign[ sfIdx ][ j ] is equal to 1), the corresponding luma filter coefficient has a
negative value.
When alf_luma_coeff_sign[ sfIdx ][ j ] is not present, it is inferred to be equal to 0.
The variable filtCoeff[ sfIdx ][ j ] with sfIdx = 0..alf_luma_num_filters_signalled_minus1, j = 0..11 is
initialized as follows:
    filtCoeff[ sfIdx ][ j ] = alf_luma_coeff_abs[ sfIdx ][ j ] *
                        ( 1 − 2 * alf_luma_coeff_sign[ sfIdx ][ j ] )
The luma filter coefficients AlfCoeff$_L$[ adaptation_parameter_set_id ] with elements
AlfCoeff$_L$[ adaptation_parameter_set_id ][ filtIdx ][ j ], with filtIdx = 0..NumAlfFilters − 1 and j = 0..11 are
derived as follows:
    AlfCoeff$_L$[ adaptation_parameter_set_id ][ filtIdx ][ j ] = filtCoeff[ alf_luma_coeff_delta_idx[ filtIdx ] ][ j ]
alf_luma_clip_idx[ sfIdx ][ j ] specifics the clipping index of the clipping value to use before multiplying by
the j-th coefficient of the signalled luma filter indicated by sfIdx. It is a requirement of bitstream
conformance that the values of alf_luma_clip_idx[ sfIdx ][ j ] with sfIdx =
0..alf_luma_num_filters_signalled_minus1 and j = 0..11 shall be in the range of 0 to 3, inclusive.
alf_chroma_num_alt_filters_minus1 plus 1 specifies the number of alternative filters for chroma components.
alf_chroma_coeff_abs_len_minus1 plus 1 specifies the number of bits used to represent the syntax element
alf_chroma_coeff_abs[ altIdx ][ j ]. The value of alf_chroma_abs_len_minus1 shall be in the range of 0 to 15,
inclusive.
alf_chroma_clip_flag[ altIdx ] equal to 0 specifies that linear adaptive loop filtering is applied on chroma
components when using the chroma filter with index altIdx; alf_chroma_clip_flag[ altIdx ] equal to 1
specifies that non-linear adaptive loop filtering is applied on chroma components when using the chroma
filter with index altIdx. When not present, alf_chroma_clip_flag[ altIdx ] is inferred to be equal to 0.
alf_chroma_coeff_abs[ altIdx ][ j ] specifies the absolute value of the j-th chroma filter coefficient for the
alternative chroma filter with index altIdx. When alf_chroma_coeff_abs[ altIdx ][ j ] is not present, it is inferred
to be equal 0.
alf_chroma_coeff_sign[ altIdx ][ j ] specifies the sign of the j-th chroma filter coefficient for the alternative
chroma filter with index altIdx as follows:
-                   If alf_chroma_coeff_sign[ altIdx ][ j ] is equal to 0, the corresponding chroma filter coefficient has a
                    positive value.
-                   Otherwise (alf_chroma_coeff_sign[ altIdx ][ j ] is equal to 1), the corresponding chroma filler coefficient
                    has a negative value.
When alf_chroma_coeff_sign[ altIdx ][ j ] is not present, it is inferred to be equal to 0.
The chroma filter coefficients AlfCoeffC[ adaptation_parameter_set_id ][ altIdx ] with elements
AlfCoeffC[ adaptation_parameter_set_id ][ altIdx ][ j ], with altIdx = 0..alf_chroma_num_alt_filters_minus1, TABLE 14-continued j = 0..5 are derived as follows:

$$\text{AlfCoeff}_C[\text{ adaptation\_parameter\_set\_id }][\text{ altIdx }][\text{ j }] = \text{alf\_chroma\_coeff\_abs}[\text{ altIdx }][\text{ j }] *$$
$$( 1 - 2 * \text{alf\_chroma\_coeff\_sign}[\text{ altIdx }][\text{ j }] )$$

According to another embodiment of the present specification, information on luma/chroma ALF filter coefficient absolute values (alf_luma_coeff_abs[sfIdx][j], alf_chroma_coeff_abs[altIdx][j]) may be parsed based on a 0-th order exponential Golomb coding scheme (ue(v)).

The following table shows exemplary syntax of ALF data according to the present embodiment.

TABLE 15

|  | Descriptor |
|---|---|
| alf_data( ) { |  |
| ... |  |
|    for( sfIdx = 0; sfIdx <= |  |
|    alf_luma_num_filters_signalled_minus1; sfIdx++ ) |  |
|      for( j = 0; j < 12; j++ ) { |  |
|        alf_luma_coeff_abs[ sfIdx ][ j ] | ue(v) |
|        if( alf_luma_coeff_abs[ sfIdx ][ j ] ) |  |
|          alf_luma_coeff_sign[ sfIdx ][ j ] | u(1) |
|    } |  |

TABLE 15-continued

|  | Descriptor |
|---|---|
|   if( alf_luma_clip_flag ) |  |
|    for( sfIdx = 0; sfIdx <= |  |
|    alf_luma_num_filters_signalled_minus1; sfIdx++ ) |  |
|     for( j = 0; j < 12; j++ ) |  |
|      alf_luma_clip_idx[ sfIdx ][ j ] | u(2) |
| } |  |
| if( alf_chroma_filter_signal_flag ) { |  |
|   alf_chroma_num_alt_filters_minus1 | ue(v) |
|   for( altIdx = 0; altIdx <= |  |
|   alf_chroma_num_alt_filters_minus1; altIdx++ ) { |  |
|    alf_chroma_clip_flag[ altIdx ] | u(1) |
|    for( j = 0; j < 6; j++ ) { |  |
|     alf_chroma_coeff_abs[ altIdx ][ j ] | ue(v) |
|     if( alf_chroma_coeff_abs[ altIdx ][ j ] > 0 ) |  |
|      alf_chroma_coeff_sign[ altIdx ][ j ] | u(1) |
|    } |  |
| ... |  |
| } |  |

The following table shows exemplary semantics related to syntax elements included in the syntax.

TABLE 16 alf_luma_coeff_abs_len_minus1 plus 1 specifies the number of bits used to represent the syntax element alf_luma_coeff_abs[ sfIdx ][ j ]. The value of alf_luma_abs_len_minus1 shall be in the range of 0 to 15, inclusive.
alf_luma_coeff_abs[ sfIdx ][ j ] specifies the absolute value of the j-th coefficient of the signalled luma filter indicated by sfIdx. When alf_luma_coeff_abs[ sfIdx ][ j ] is not present, it is inferred to be equal 0. The value of alf_luma_coeff_abs[ sfIdx ][ j ] shall be in the range of 0 to 128, inclusive.
alf_luma_coeff_sign[ sfIdx ][ j ] specifics the sign of the j-th luma coefficient of the filter indicated by sfIdx as follows:
- If alf_luma_coeff_sign[ sfIdx ][ j ] is equal to 0, the corresponding luma filter coefficient has a positive value.
- Otherwise (alf_luma_coeff_sign[ sfIdx ][ j ] is equal to 1), the corresponding luma filter coefficient has a negative value.
When alf_luma_coeff_sign[ sfIdx ][ j ] is not present, it is inferred to be equal to 0.
The variable filtCoeff[ sfIdx ][ j ] with sfIdx = 0..alf_luma_num_filters_signalled_minus1, j = 0..11 is initialized as follows:
    filtCoeff[ sfIdx ][ j ] = alf_luma_coeff_abs[ sfIdx ][ j ] *
       ( 1 - 2 * alf_luma_coeff_sign[ sfIdx ][ j ] )
The luma filter coefficients AlfCoeff$_L$[ adaptation_parameter_set_id ] With elements
AlfCoeff$_L$[ adaptation_parameter_set_id ][ filtIdx ][ j ], with filtIdx = 0..NumAlfFilters − 1 and j = 0..11 are derived as follows:
   AlfCoeff$_L$[ adaptation_parameter_set_id ][ filtIdx ][ j ] = filtCoeff[ alf_luma_coeff_delta_idx[ filtIdx ] ][ j ]
alf_luma_clip_idx[ sfIdx ][ j ] specifies the clipping index of the clipping value to use before multiplying by the j-th coefficient of the signalled luma filter indicated by sfIdx. It is a requirement of bitstream conformance that the values of alf_luma_clip_idx[ sfIdx ][ j ] with sfIdx = 0..alf_luma_num_filters_signalled_minus1 and j = 0..11 shall be in the range of 0 to 3, inclusive.
alf_chroma_num_alt_filters_minus1 plus 1 specifies the number of alternative filters for chroma components.
alf_chroma_coeff_abs_len_minus1 plus 1 specifies the number of bits used to represent the syntax element alf_chroma_coeff_abs[ altIdx ][ j ]. The value of alf_chroma_abs_len_minus1 shall be in the range of 0 to 15, inclusive.
alf_chroma_clip_flag[ altIdx ] equal to 0 specifies that linear adaptive loop filtering is applied on chroma components when using the chroma filter with index altIdx; alf_chroma_clip_flag[ altIdx ] equal to 1 specifies that non-linear adaptive loop filtering is applied on chroma components when using the chroma filter with index altIdx. When not present, alf_chroma_clip_flag[ altIdx ] is inferred to be equal to 0.
alf_chroma_coeff_abs[ altIdx ][ j ] specifies the absolute value of the j-th chroma filter coefficient for the alternative chroma filter with index altIdx. When alf_chroma_coeff_abs[ altIdx ][ j ] is not present, it is inferred to be equal 0. The value of alf_chroma_coeff_abs[ altIdx ][ j ] shall be in the range of 0 to 128, inclusive.
alf_chroma_coeff_sign[ altIdx ][ j ] specifies the sign of the j-th chroma filter coefficient for the alternative chroma filter with index altIdx as follows:
-       If alf_chroma_coeff_sign[ altIdx ][ j ] is equal to 0, the corresponding chroma filter coefficient has a postive value.
-       Otherwise (alf_chroma_coeff_sign[ altIdx ][ j ] is equal to 1), the corresponding chroma filter coefficient has a negative value.
When alf_chroma_coeff_sign[ altIdx ][ j ] is not present, it is inferred to be equal to 0.
The chroma filter coefficients AlfCoeffC[ adaptation_parameter_set_id ][ altIdx ] with elements
AlfCoeffC[ adaptation_parameter_set_id ][ altIdx ][ j ], with altIdx = 0..alf_chroma_num_alt_filters_minus1.

TABLE 16-continued j = 0..5 are derived as follows:
$$\text{AlfCoeff}_C[\text{ adaptation\_parameter\_set\_id }][\text{ altIdx }][\text{ j }] = \text{alf\_chroma\_coeff\_abs}[\text{ altIdx }][\text{ j }] *$$
$$(1 - 2 * \text{alf\_chroma\_coeff\_sign}[\text{ altIdx }][\text{ j }])$$

According to the embodiments of the present specification that are described with reference to the tables presented above, by using a 0-th order exponential Golomb coding scheme (ue(v)) for the parsing procedure on the information related to luma/chroma ALF filter coefficient absolute values (alf_luma_coeff_abs[sfIdx][j], alf_chroma_coeff_abs[al-tIdx][j]), the operational overhead and complexity may be reduced. Additionally, by fixing the value range (e.g., 0 to 128) of the values of the information related to the luma/chroma ALF filter coefficient absolute values, coding using (ue(v)) may be efficiently performed.

Figure 6:
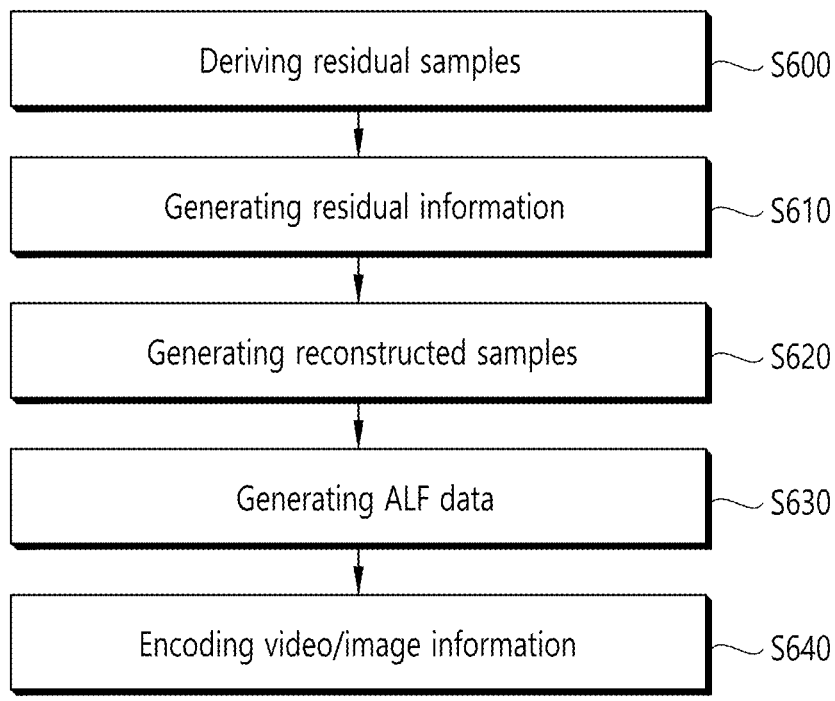
FIG. 6 and FIG. 7 respectively show general examples of a video/image encoding method and a related component according to an embodiment(s) of the present disclosure.
Figure 7:
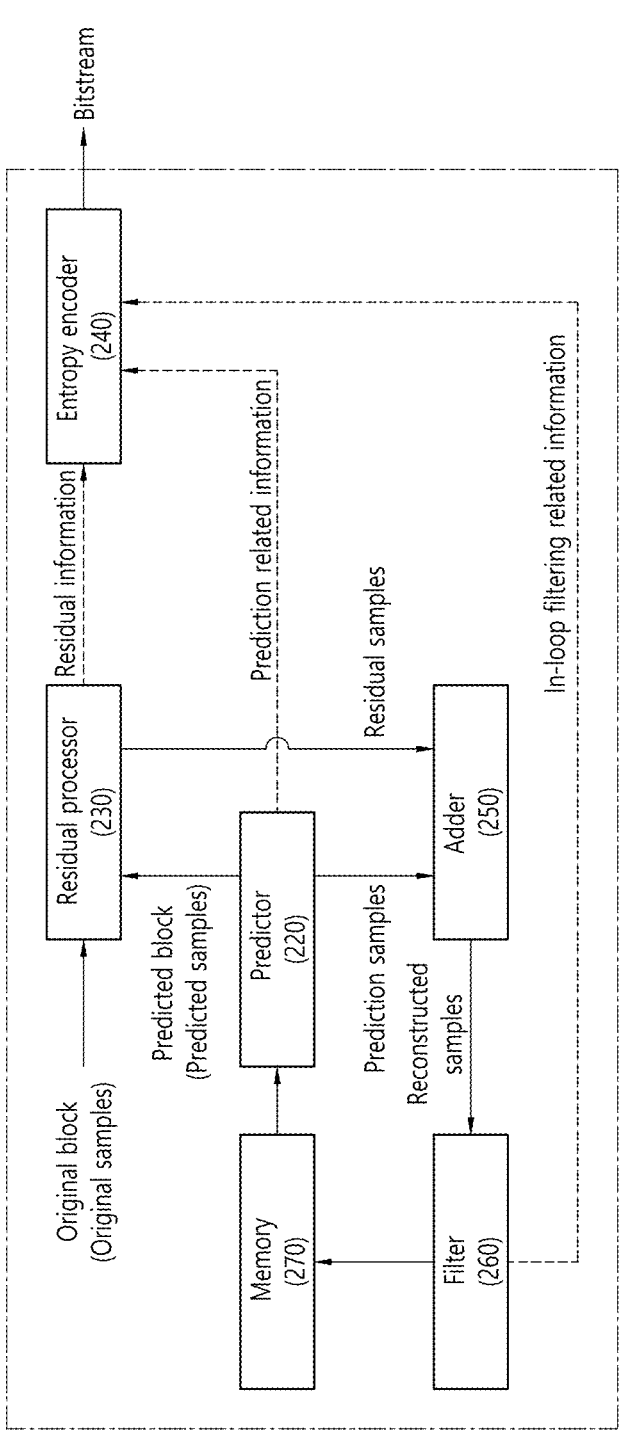

FIG. 6 and FIG. 7 respectively show general examples of a video/image encoding method and a related component according to an embodiment(s) of the present disclosure.

The method disclosed in FIG. 6 may be performed by the encoding apparatus that is shown in FIG. 2 or FIG. 7. More specifically, for example, S600 and S610 of FIG. 6 may be performed by the residual processor 230 of the encoding apparatus of FIG. 7, S620 of FIG. 6 may be performed by the adder 250 of the encoding apparatus of FIG. 7, S630 of FIG. 6 may be performed by the filter 260 of the encoding apparatus of FIG. 7, and S640 of FIG. 6 may be performed by the entropy encoder 240 of the encoding apparatus of FIG. 7. Additionally, although it is not shown in FIG. 6, prediction samples or prediction-related information may be derived by the predictor 220 of the encoding apparatus, and a bitstream may be generated from the residual information or prediction-related information by the entropy encoder 240 of the encoding apparatus. The method disclosed in FIG. 6 may include the above-described embodiments in the present specification.

Referring to FIG. 6, the encoding apparatus may derive residual samples (S600). The encoding apparatus may derive residual samples for a current block, and residual samples for the current block may be derived based on original samples and prediction samples of the current block. More specifically, the encoding apparatus may derive prediction samples of the current block based on a prediction mode. In this case, various prediction methods that are disclosed in the present specification, such as inter prediction or intra prediction, and so on, may be applied. Residual samples may be derived based on the prediction samples and the original samples. For inter prediction, the encoding apparatus may derive at least one reference picture, and inter prediction may be performed based on the at least one reference picture. Prediction samples may be generated based on the inter prediction. The encoding apparatus may generate reference picture related information based on the at least on reference picture.

The encoding apparatus may derive transform coefficients. The encoding apparatus may derive transform coefficients based on a transform (or transformation) procedure on the residual samples. For example, the transform procedure may include at least one of DCT, DST, GBT, or CNT.

The encoding apparatus may derive quantized transform coefficients. The encoding apparatus may derive quantized transform coefficients based on a quantization procedure on the transform coefficients. The quantized transform coefficients may have a one-dimensional vector form based on a coefficient scan order.

The encoding apparatus may generate residual information (S610). The encoding apparatus may generate residual information based on the residual samples for the current block. The encoding apparatus may generate residual information indicating the quantized transform coefficients. The residual information may be generated through various encoding methods, such as exponential Golomb, CAVLC, CABAC, and so on.

The encoding apparatus may generate reconstructed samples (S620). The encoding apparatus may generate reconstructed samples based on the residual information. The reconstructed samples may be generated by adding the residual samples that are based on the residual information and the prediction samples. More specifically, the encoding apparatus may perform prediction (intra or inter prediction) on a current block and may, then, generate reconstructed samples based on prediction samples, which are generated from the prediction with the original samples.

The reconstructed samples may include reconstructed luma samples and reconstructed chroma samples. More specifically, residual samples may include residual luma samples and residual chroma samples. The residual luma samples may be generated based on original luma samples and prediction luma samples. The residual chroma samples may be generated based on original chroma samples and prediction chroma samples. The encoding apparatus may derive transform coefficients for the residual luma samples (luma transform coefficients) and/or derive transform coefficients for the residual chroma samples (chroma transform coefficients). The quantized transform coefficients may include quantized luma transform coefficients and/or quantized chroma transform coefficients.

The encoding apparatus may generate ALF data (S630). The ALF data may include information related to ALF filter coefficients. The ALF filter coefficients may include luma ALF filter coefficients and/or chroma ALF filter coefficients. And, modified reconstructed samples may be generated based on the ALF filter coefficients.

The encoding apparatus may generate ALF-related information. The ALF-related information may include ALF data. The ALF data may include information related to ALF filter coefficients, information related to ALF-related clipping, and so on. In addition, the ALF-related information may include information related to an availability flag, information related to a presence flag for designating a position of a high level syntax (e.g., PPS, SPS, APS, picture header, and so on). For example, the information related to ALF filter coefficients may include information related to absolute values of the ALF filter coefficients, and information related to signs of the ALF filter coefficients.

The encoding apparatus may encode video/image information (S640). The image information may include residual information, prediction-related information, reference picture related information, subpicture-related information, in-loop filtering related information, and/or virtual boundary related information (and/or additional virtual boundary related information). The encoded video/image information may be outputted in a bitstream format. The bitstream may be transmitted to the decoding apparatus through a network or storage medium.

The video/image information may include various information according to the embodiment(s) of the present specification. For example, the video/image information may include information disclosed in at least one of Table 1 to Table 16, which are presented above.

According to an embodiment, the ALF data may include information on absolute values of luma filter coefficients for the ALF procedure. The information on absolute values of luma filter coefficients for the ALF procedure may be coded based on ue(v).

According to an embodiment, the image information may include parameter sets. At least one of the parameter sets may include an adaptation parameter set (APS). The ALF data may be included in the APS.

According to an embodiment, the image information may include header information and an ALF-related adaptation parameter set (APS). The header information may include information related to a number of ALF-related APS IDs. The number of ALF-related APS IDs may be derived based on a value of the information related to the number of ALF-related APS IDs. A number of ALF-related APS ID syntax elements equal to the number of ALF-related APS IDs may be included in the header information.

According to an embodiment, the image information may include header information and an ALF-related adaptation parameter set (APS). The header information may include an ALF availability flag indicating the availability of the ALF within a picture or slice and information related to a number of ALF-related APS IDs. When the value of the ALF availability flag is equal to 1, the header information may include the information related to a number of ALF-related APS IDs. The value of the information related to a number of ALF-related APS IDs plus 1 may be the same as the number of ALF-related APS IDs.

According to an embodiment, the absolute values of luma filter coefficients for the ALF procedure may be within a predetermined range.

According to an embodiment, the performing the ALF procedure may include the steps of deriving absolute values of chroma filter coefficients for the ALF procedure based on the ALF data, deriving chroma filter coefficients for the ALF procedure based on the absolute values of chroma filter coefficients for the ALF procedure, and generating modified chroma reconstructed samples based on the reconstructed samples and the chroma filter coefficients. The ALF data may include information on absolute values of chroma filter coefficients for the ALF procedure. The information on absolute values of chroma filter coefficients for the ALF procedure may be coded based on ue(v).

According to an embodiment, the absolute values of chroma filter coefficients for the ALF procedure may be within a predetermined range.

Figure 8:
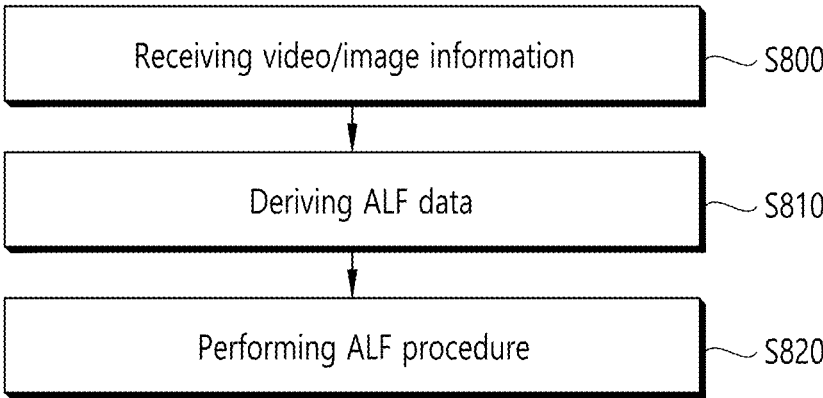
FIG. 8 and FIG. 9 respectively show general examples of a video/image decoding method and a related component according to an embodiment embodiment(s) of the present disclosure.
Figure 9:
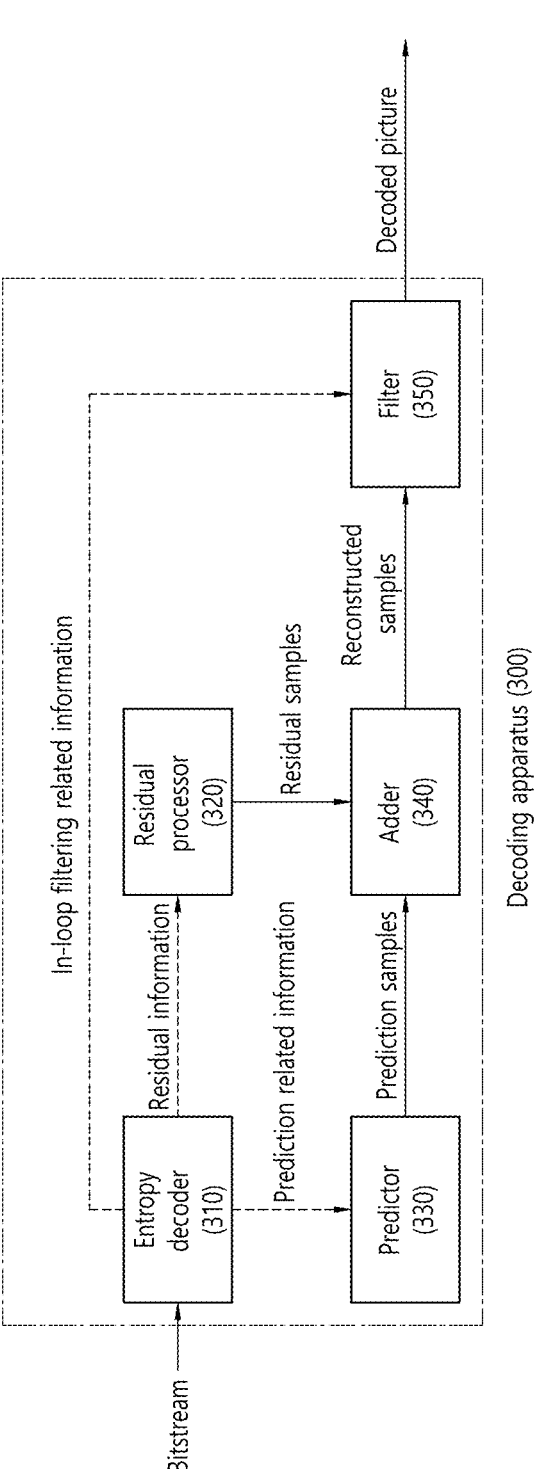

FIG. 8 and FIG. 9 respectively show general examples of a video/image decoding method and a related component according to an embodiment embodiment(s) of the present disclosure.

The method disclosed in FIG. 8 may be performed by the decoding apparatus that is shown in FIG. 3 or FIG. 9. More specifically, for example, S800 of FIG. 8 may be performed by the entropy decoder 310 of the decoding apparatus, S810 may be performed by the adder 340 of the decoding apparatus, and S820 and/or S830 may be performed by the filter 350 of the decoding apparatus. The method disclosed in FIG. 8 may include the above-described embodiments in the present specification.

Referring to FIG. 8, the decoding apparatus may receive/obtain video/image information (S800). The video/image information may include residual information, prediction-related information, reference picture related information, subpicture-related information, in-loop filtering related information, and/or ALF-related information. The decoding apparatus may receive/obtain the video/image information through a bitstream.

The video/image information may include various information according to the embodiment(s) of the present specification. For example, the video/image information may include information disclosed in at least one of Table 1 to Table 16, which are presented above.

The decoding apparatus may derive quantized transform coefficients. The decoding apparatus may derive quantized transform coefficients based on the residual information. The quantized transform coefficients may have a one-dimensional vector form based on a coefficient scan order. The quantized transform coefficients may include quantized luma transform coefficients and/or quantized chroma transform coefficients.

The decoding apparatus may derive transform coefficients. The decoding apparatus may derive transform coefficients based on a dequantization procedure on the quantized transform coefficients. The decoding apparatus may derive luma transform coefficients through dequantization based on the quantized luma transform coefficients. The decoding apparatus may derive chroma transform coefficients through dequantization based on the quantized chroma transform coefficients.

The decoding apparatus may generate/derive residual samples. The decoding apparatus may derive residual samples based on an inverse transform procedure on the transform coefficients. The decoding apparatus may derive residual luma samples through an inverse transform procedure based on residual luma samples. The decoding apparatus may derive residual chroma samples through an inverse transform procedure based on residual chroma samples.

The decoding apparatus may derive at least one reference picture based on reference picture related information. The decoding apparatus may perform a prediction procedure on the at least one reference picture. More specifically, the decoding apparatus may generate prediction samples of the current block based on a prediction mode. In this case, various prediction methods that are disclosed in the present specification, such as inter prediction or intra prediction, and so on, may be applied. The decoding apparatus may generate prediction samples for a current block within a current picture based on the prediction procedure. For example, the decoding apparatus may perform an inter prediction procedure based on the at least one reference picture and may generate prediction samples based on the inter prediction procedure.

The decoding apparatus may generate/derive reconstructed samples (S810). For example, the decoding apparatus may generate/derive reconstructed luma samples and/or reconstructed chroma samples. The decoding apparatus may generate reconstructed luma samples and/or reconstructed chroma samples based on the residual information. The decoding apparatus may generate reconstructed samples based on the residual information. The reconstructed samples may include reconstructed luma samples and/or reconstructed chroma samples. A luma component of the reconstructed samples may correspond to the reconstructed luma samples, and a chroma component of the reconstructed samples may correspond to the reconstructed chroma samples. The decoding apparatus may generate prediction luma samples and/or prediction chroma samples through a prediction procedure. The decoding apparatus may generate reconstructed luma samples based on prediction luma samples and residual luma samples. The decoding apparatus may generate reconstructed chroma samples based on prediction chroma samples and residual chroma samples.

The decoding apparatus may derive ALF data (S820). The ALF data may include information related to ALF filter coefficients. The ALF filter coefficients may include luma ALF filter coefficients and/or chroma ALF filter coefficients. And, modified reconstructed samples may be generated based on the ALF filter coefficients.

The decoding apparatus may perform the ALF procedure of the reconstructed samples based on the ALF data (S820). The performing the ALF procedure may include the steps of deriving absolute values of luma filter coefficients for the ALF procedure based on the ALF data, deriving luma filter coefficients for the ALF procedure based on the absolute values of luma filter coefficients for the ALF procedure, and generating modified luma reconstructed samples based on the reconstructed samples and the luma filter coefficients.

The decoding apparatus may generate modified (filtered) reconstructed samples. The decoding apparatus may generate modified reconstructed samples based on an in-loop filtering procedure on the reconstructed samples. The decoding apparatus may generate modified reconstructed samples based on in-loop filtering related information. The decoding apparatus may use the deblocking procedure, the SAO procedure, and/or the ALF procedure in order to generate modified reconstructed samples.

According to an embodiment, the image information may include parameter sets. At least one of the parameter sets may include ALF data. The filter coefficients may be derived based on a 0-th order Exponential Golomb coding from the ALF data.

According to an embodiment, the image information may include parameter sets. And, at least one of the parameter sets may include an adaptation parameter set (APS). The ALF data may be included in the APS.

According to an embodiment, the image information may include header information and an ALF-related adaptation parameter set (APS). The header information may include information related to a number of ALF-related APS IDs. The number of ALF-related APS IDs may be derived based on a value of the information related to the number of ALF-related APS IDs. A number of ALF-related APS ID syntax elements equal to the number of ALF-related APS IDs may be included in the header information.

According to an embodiment, the image information may include header information and an ALF-related adaptation parameter set (APS). The header information may include an ALF availability flag indicating the availability of the ALF within a picture or slice and information related to a number of ALF-related APS IDs. When the value of the ALF availability flag is equal to 1, the header information may include the information related to a number of ALF-related APS IDs. The value of the information related to a number of ALF-related APS IDs plus 1 may be the same as the number of ALF-related APS IDs.

According to an embodiment, the absolute values of luma filter coefficients for the ALF procedure may be within a predetermined range.

According to an embodiment, the performing the ALF procedure may include the steps of deriving absolute values of chroma filter coefficients for the ALF procedure based on the ALF data, deriving chroma filter coefficients for the ALF procedure based on the absolute values of chroma filter coefficients for the ALF procedure, and generating modified chroma reconstructed samples based on the reconstructed samples and the chroma filter coefficients. The ALF data may include information on absolute values of chroma filter coefficients for the ALF procedure. The information on absolute values of chroma filter coefficients for the ALF procedure may be coded based on ue(v).

According to an embodiment, the absolute values of chroma filter coefficients for the ALF procedure may be within a predetermined range.

When the residual sample for the current block exists, the decoding apparatus may receive the information on the residual for the current block. The information on the residual may include the transform coefficients on the residual samples. The decoding apparatus may derive the residual samples (or residual sample array) for the current block based on the residual information. Specifically, the decoding apparatus may derive the quantized transform coefficients based on the residual information. The quantized transform coefficients may have a one-dimensional vector form based on a coefficient scan order. The decoding apparatus may derive the transform coefficients based on the dequantization process for the quantized transform coefficients. The decoding apparatus may derive the residual samples based on the transform coefficients.

The decoding apparatus may generate a reconstructed samples based on the (intra) prediction samples and residual samples, and may derive the reconstructed block or the reconstructed picture based on the reconstructed samples. Specifically, the decoding apparatus may generate reconstructed samples based on a sum between the (intra) prediction samples and the residual samples. Thereafter, as described above, the decoding apparatus may apply an in-loop filtering process such as deblocking filtering and/or SAO process to the reconstructed picture in order to improve the subjective/objective picture quality, if necessary For example, the decoding apparatus may obtain image information including all or parts of the above-described pieces of information (or syntax elements) by decoding the bitstream or the encoded information. Further, the bitstream or the encoded information may be stored in a computer readable storage medium, and may cause the above-described decoding method to be performed.

Although methods have been described on the basis of a flowchart in which steps or blocks are listed in sequence in the above-described embodiments, the steps of the present document are not limited to a certain order, and a certain step may be performed in a different step or in a different order or concurrently with respect to that described above. Further, it will be understood by those ordinary skilled in the art that the steps of the flowcharts are not exclusive, and another step may be included therein or one or more steps in the flowchart may be deleted without exerting an influence on the scope of the present disclosure.

The aforementioned method according to the present disclosure may be in the form of software, and the encoding apparatus and/or decoding apparatus according to the present disclosure may be included in a device for performing image processing, for example, a TV, a computer, a smart phone, a set-top box, a display device, or the like.

When the embodiments of the present disclosure are implemented by software, the aforementioned method may be implemented by a module (process or function) which performs the aforementioned function. The module may be stored in a memory and executed by a processor. The memory may be installed inside or outside the processor and may be connected to the processor via various well-known means. The processor may include Application-Specific Integrated Circuit (ASIC), other chipsets, a logical circuit, and/or a data processing device. The memory may include a Read-Only Memory (ROM), a Random Access Memory (RAM), a flash memory, a memory card, a storage medium, and/or other storage device. In other words, the embodiments according to the present disclosure may be implemented and executed on a processor, a micro-processor, a controller, or a chip. For example, functional units illustrated in the respective figures may be implemented and executed on a computer, a processor, a microprocessor, a controller, or a chip. In this case, information on implementation (for example, information on instructions) or algorithms may be stored in a digital storage medium.

In addition, the decoding apparatus and the encoding apparatus to which the embodiment(s) of the present document is applied may be included in a multimedia broadcasting transceiver, a mobile communication terminal, a home cinema video device, a digital cinema video device, a surveillance camera, a video chat device, and a real time communication device such as video communication, a mobile streaming device, a storage medium, a camcorder, a video on demand (VoD) service provider, an Over The Top (OTT) video device, an internet streaming service provider, a 3D video device, a Virtual Reality (VR) device, an Augment Reality (AR) device, an image telephone video device, a vehicle terminal (for example, a vehicle (including an autonomous vehicle) terminal, an airplane terminal, or a ship terminal), and a medical video device; and may be used to process an image signal or data. For example, the OTT video device may include a game console, a Bluray player, an Internet-connected TV, a home theater system, a smartphone, a tablet PC, and a Digital Video Recorder (DVR).

In addition, the processing method to which the embodiment(s) of the present document is applied may be produced in the form of a program executed by a computer and may be stored in a computer-readable recording medium. Multimedia data having a data structure according to the embodiment(s) of the present document may also be stored in the computer-readable recording medium. The computer readable recording medium includes all kinds of storage devices and distributed storage devices in which computer readable data is stored. The computer-readable recording medium may include, for example, a Bluray disc (BD), a universal serial bus (USB), a ROM, a PROM, an EPROM, an EEPROM, a RAM, a CD-ROM, a magnetic tape, a floppy disk, and an optical data storage device. The computer-readable recording medium also includes media embodied in the form of a carrier wave (for example, transmission over the Internet). In addition, a bitstream generated by the encoding method may be stored in the computer-readable recording medium or transmitted through a wired or wireless communication network.

In addition, the embodiment(s) of the present document may be embodied as a computer program product based on a program code, and the program code may be executed on a computer according to the embodiment(s) of the present document. The program code may be stored on a computer-readable carrier.

Figure 10:
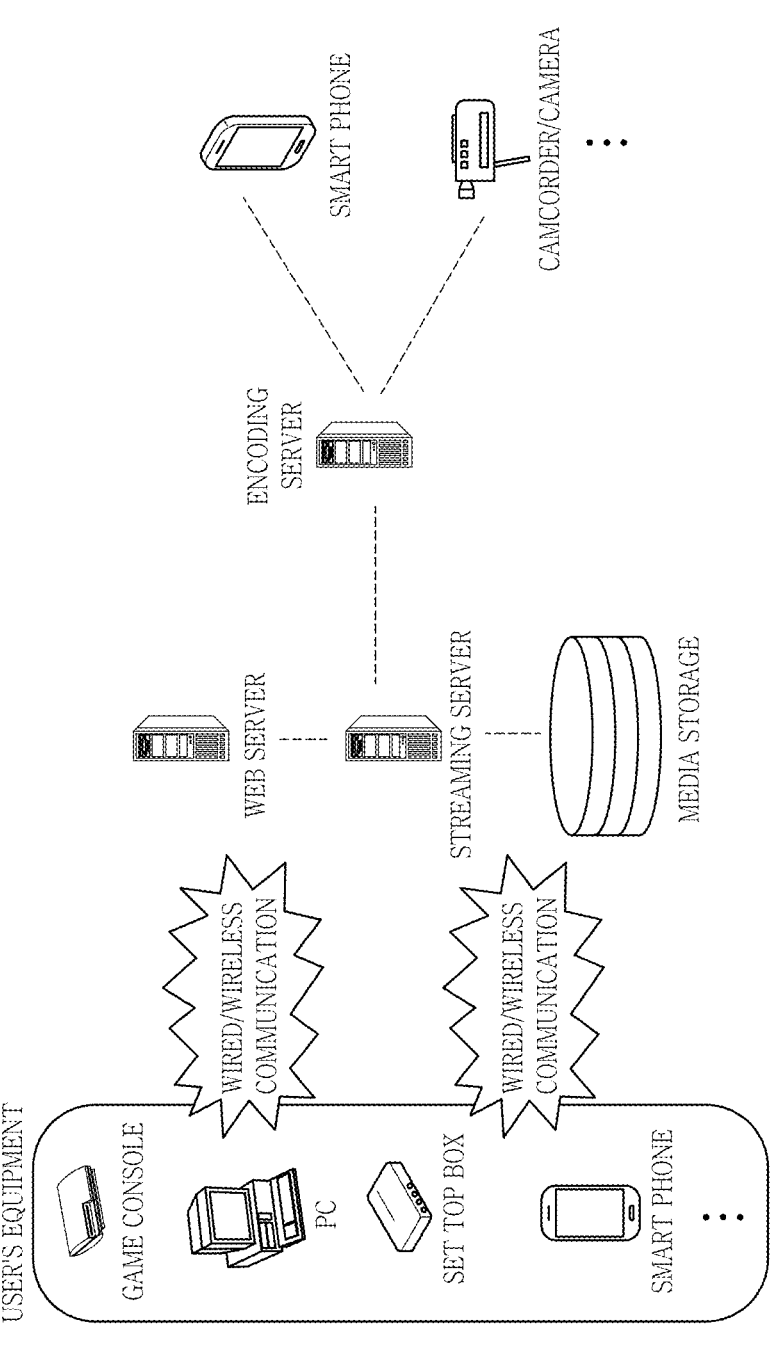
FIG. 10 shows an example of a contents streaming system to which the embodiment of the present disclosure may be applied.

FIG. 10 represents an example of a contents streaming system to which the embodiment of the present document may be applied.

Referring to FIG. 10, the content streaming system to which the embodiments of the present document is applied may generally include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted.

The bitstream may be generated by an encoding method or a bitstream generation method to which the embodiments of the present document is applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipment in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in distributed manner.

Claims in the present description can be combined in a various way. For example, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. An image decoding apparatus comprising:
   a memory; and
   at least one processor connected to the memory, the at least one processor configured to:
   receive image information through a bitstream;
   generate reconstructed samples based on the image information;
   derive ALF data for an adaptive loop filter (ALF) procedure of the reconstructed samples; and
   perform the ALF procedure of the reconstructed samples based on the ALF data,
   wherein in the ALF procedure, the at least one processor is further configured to:

derive absolute values of luma filter coefficients for the ALF procedure based on the ALF data;

derive luma filter coefficients for the ALF procedure based on the absolute values of luma filter coefficients for the ALF procedure; and generate modified luma reconstructed samples based on the reconstructed samples and the luma filter coefficients, wherein the ALF data includes information related to absolute values of luma filter coefficients for the ALF procedure, and wherein the information related to absolute values of luma filter coefficients for the ALF procedure is coded based on ue(v).

2. The image decoding apparatus of claim 1, wherein the image information includes parameter sets, wherein at least one of the parameter sets includes an adaptation parameter set (APS), and wherein the ALF data is included in the APS.

3. The image decoding apparatus of claim 1, wherein the image information includes header information and ALF-related adaptation parameter set (APS), wherein the header information includes information related to a number of ALF-related APS IDs, wherein the number of ALF-related APS IDs is derived based on a value of information related to the number of ALF-related APS IDs, and wherein a number of ALF-related APS ID syntax elements equal to the number of ALF related APS IDs is included in the header information.

4. The image decoding apparatus of claim 1, wherein the image information includes header information and an ALF-related adaptation parameter set (APS), wherein the header information includes an ALF availability flag indicating whether or not the ALF is available for usage within a picture or slice and information related to a number of ALF-related APS IDs, wherein, when a value of the ALF availability flag is equal to 1, the header information includes the information related to a number of ALF-related APS IDs, and wherein a value of the information related to a number of ALF-related APS IDs is equal to the number of ALF-related APS IDs.

5. The image decoding apparatus of claim 1, wherein the absolute values of luma filter coefficients for the ALF procedure are within a predetermined range.

6. The image decoding apparatus of claim 1, wherein in the ALF procedure, the at least one processor is further configured to:

derive absolute values of chroma filter coefficients for the ALF procedure based on the ALF data;

derive chroma filter coefficients for the ALF procedure based on the absolute values of chroma filter coefficients for the ALF procedure; and generate modified chroma reconstructed samples based on the reconstructed samples and the chroma filter coefficients, wherein the ALF data includes information related to absolute values of chroma filter coefficients for the ALF procedure, and wherein the information related to absolute values of chroma filter coefficients for the ALF procedure is coded based on ue(v).

7. The image decoding apparatus of claim 6, wherein the absolute values of chroma filter coefficients for the ALF procedure are within a predetermined range.

8. An image encoding apparatus comprising:

a memory; and at least one processor connected to the memory, the at least one processor configured to:

derive residual samples for a current block;

generate residual information based on the residual samples;

generate reconstructed samples based on the residual information;

generate ALF data for an adaptive loop filter (ALF) procedure of the reconstructed samples; and encode image information including the residual information and the ALF data, wherein the ALF data includes information related to absolute values of luma filter coefficients for the ALF procedure, and wherein the information related to absolute values of luma filter coefficients for the ALF procedure is coded based on ue(v).

9. The image encoding apparatus of claim 8, wherein the image information includes parameter sets, wherein at least one of the parameter sets includes an adaptation parameter set (APS), and wherein the ALF data is included in the APS.

10. The image encoding apparatus of claim 8, wherein the image information includes header information and ALF-related adaptation parameter set (APS), wherein the header information includes information related to a number of ALF-related APS IDs, wherein the number of ALF-related APS IDs is derived based on a value of information related to the number of ALF-related APS IDs, and wherein a number of ALF-related APS ID syntax elements equal to the number of ALF related APS IDs is included in the header information.

11. The image encoding apparatus of claim 8, wherein the image information includes header information and an ALF-related adaptation parameter set (APS), wherein the header information includes an ALF availability flag indicating whether or not the ALF is available for usage within a picture or slice and information related to a number of ALF-related APS IDs, wherein, when a value of the ALF availability flag is equal to 1, the header information includes the information related to a number of ALF-related APS IDs, and wherein a value of the information related to a number of ALF-related APS IDs is equal to the number of ALF-related APS IDs.

12. The image encoding apparatus of claim 8, wherein the absolute values of luma filter coefficients for the ALF procedure are within a predetermined range.

13. The image encoding apparatus of claim 8, wherein in the ALF procedure, the at least one processor is further configured to:

derive absolute values of chroma filter coefficients for the ALF procedure based on the ALF data;

derive chroma filter coefficients for the ALF procedure based on the absolute values of chroma filter coefficients for the ALF procedure; and generate modified chroma reconstructed samples based on the reconstructed samples and the chroma filter coefficients, wherein the ALF data includes information related to absolute values of chroma filter coefficients for the ALF procedure, and wherein the information related to absolute values of chroma filter coefficients for the ALF procedure is coded based on ue(v).

14. The image encoding apparatus of claim 13, wherein the absolute values of chroma filter coefficients for the ALF procedure are within a predetermined range.

15. An apparatus for transmitting data for an image, the apparatus comprising:

at least one processor configured to obtain a bitstream; and a transmitter configured to transmit the bitstream;

wherein the bitstream is generated by an image encoding method, the image encoding method comprising:

deriving residual samples for a current block;

generating residual information based on the residual samples;

generating reconstructed samples based on the residual information;

generating ALF data for an adaptive loop filter (ALF) procedure of the reconstructed samples; and encoding image information to generate the bitstream, wherein the image information includes the residual information and the ALF data, wherein the ALF data includes information related to absolute values of luma filter coefficients for the ALF procedure, and wherein the information related to absolute values of luma filter coefficients for the ALF procedure is coded based on ue(v).

* * * * *